(12) United States Patent
Corbin

(10) Patent No.: US 12,073,146 B2
(45) Date of Patent: *Aug. 27, 2024

(54) PRIORITIZING MEDIA CONTENT REQUESTS

(71) Applicant: Sonos, Inc., Santa Barbara, CA (US)

(72) Inventor: Keith Corbin, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,054

(22) Filed: Aug. 8, 2022

(65) Prior Publication Data

US 2023/0022391 A1    Jan. 26, 2023

Related U.S. Application Data

(63) Continuation of application No. 17/146,065, filed on Jan. 11, 2021, now Pat. No. 11,409,496, which is a
(Continued)

(51) Int. Cl.
*G06F 3/16* (2006.01)
*G05B 15/02* (2006.01)
(Continued)

(52) U.S. Cl.
CPC ............. *G06F 3/165* (2013.01); *G05B 15/02* (2013.01); *G06F 9/4881* (2013.01);
(Continued)

(58) Field of Classification Search
CPC ........ G06F 3/165; G06F 16/64; G06F 16/178; G06F 16/686; G06F 9/4881;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| CN | 101247409 A | 8/2008 |
| CN | 102104623 A | 6/2011 |

(Continued)

OTHER PUBLICATIONS

Advisory Action mailed on Jan. 12, 2017, issued in connection with U.S. Appl. No. 14/475,093, filed Sep. 2, 2014, 11 pages.
(Continued)

*Primary Examiner* — Fan S Tsang
*Assistant Examiner* — David Siegel
(74) *Attorney, Agent, or Firm* — FORTEM IP LLP

(57) ABSTRACT

Example techniques relate to prioritizing media content requests. An example implementation involves a computing system receives an explicit request to play back a playlist on one or more playback devices of a media playback system. The computing system causes the playback devices to play back a given audio track of the playlist. While the playback devices are playing back first tracks of the playlist, the computing system receives one or more implicit requests for second audio tracks in the playlist. While the playback devices are playing back the second audio tracks of the playlist, the computing system receives an explicit request to play back audio content on a mobile device. The computing system determines that the request to play back the audio content on the mobile device is a higher priority than the requests for second audio tracks and switches playback from the playback devices to the mobile device.

20 Claims, 13 Drawing Sheets

Related U.S. Application Data continuation of application No. 16/657,846, filed on Oct. 18, 2019, now Pat. No. 10,891,104, which is a continuation of application No. 15/592,484, filed on May 11, 2017, now Pat. No. 10,452,343, which is a continuation of application No. 14/485,602, filed on Sep. 12, 2014, now Pat. No. 9,720,642.

(60) Provisional application No. 62/027,215, filed on Jul. 21, 2014, provisional application No. 62/007,906, filed on Jun. 4, 2014.

(51) Int. Cl.
| | |
|---|---|
| *G06F 9/48* | (2006.01) |
| *G06F 16/178* | (2019.01) |
| *G06F 16/64* | (2019.01) |
| *G06F 16/68* | (2019.01) |
| *H04N 21/436* | (2011.01) |
| *H04N 21/45* | (2011.01) |
| *H04N 21/458* | (2011.01) |
| *H04N 21/472* | (2011.01) |
| *H04N 21/482* | (2011.01) |
| *H04N 21/61* | (2011.01) |
| *H04N 21/81* | (2011.01) |
| *H04R 27/00* | (2006.01) |

(52) U.S. Cl.
CPC ............ *G06F 16/178* (2019.01); *G06F 16/64* (2019.01); *G06F 16/686* (2019.01); *H04N 21/43615* (2013.01); *H04N 21/4518* (2020.08); *H04N 21/4583* (2013.01); *H04N 21/47202* (2013.01); *H04N 21/4825* (2013.01); *H04N 21/6125* (2013.01); *H04N 21/8113* (2013.01); *H04R 27/00* (2013.01); *H04R 2227/005* (2013.01)

(58) Field of Classification Search
CPC ......... H04N 21/4518; H04N 21/43615; H04N 21/4583; H04N 21/47202; H04N 21/4825; H04N 21/6125; H04N 21/8113; G05B 15/02; H04R 27/00; H04R 2227/005

See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,934,269 B1 | 8/2005 | Hasha et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,797,446 B2 | 9/2010 | Heller et al. | |
| 7,805,682 B1 | 9/2010 | Lambourne | |
| 7,827,259 B2 | 11/2010 | Heller et al. | |
| 7,853,341 B2 | 12/2010 | McCarty et al. | |
| 7,958,441 B2 | 6/2011 | Heller et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,204,890 B1 | 6/2012 | Gogan | |
| 8,234,395 B2 | 7/2012 | Millington | |
| 8,370,952 B1 | 2/2013 | Wieder | |
| 8,483,853 B1 | 7/2013 | Lambourne | |
| 8,516,093 B2 | 8/2013 | Bank | |
| 8,818,538 B2 | 8/2014 | Sakata | |
| 8,826,344 B1* | 9/2014 | Gavade | H04N 21/4424 725/89 |
| 8,942,252 B2 | 1/2015 | Balassanian et al. | |
| 9,226,013 B2 | 12/2015 | Fishwick | |
| 9,286,384 B2 | 3/2016 | Kuper et al. | |
| 9,363,254 B2 | 6/2016 | Beckhardt et al. | |
| 9,363,255 B2 | 6/2016 | Coburn, IV | |
| 9,374,607 B2 | 6/2016 | Bates et al. | |
| 9,537,852 B2 | 1/2017 | Beckhardt et al. | |
| 9,648,070 B2 | 5/2017 | Beckhardt et al. | |
| 9,654,459 B2 | 5/2017 | Coburn, IV et al. | |
| 9,654,536 B2 | 5/2017 | Coburn, IV et al. | |
| 9,654,821 B2 | 5/2017 | Coburn, IV et al. | |
| 9,703,521 B2 | 7/2017 | Kumar et al. | |
| 10,320,803 B2 | 6/2019 | Gratton et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2002/0138641 A1 | 9/2002 | Taylor et al. | |
| 2003/0157951 A1 | 8/2003 | Hasty, Jr. | |
| 2004/0024478 A1 | 2/2004 | Hans et al. | |
| 2004/0139222 A1 | 7/2004 | Slik et al. | |
| 2004/0215611 A1 | 10/2004 | Jawa et al. | |
| 2005/0240661 A1 | 10/2005 | Heller et al. | |
| 2007/0038999 A1 | 2/2007 | Millington | |
| 2007/0129005 A1 | 6/2007 | Goldberg et al. | |
| 2007/0142944 A1 | 6/2007 | Goldberg et al. | |
| 2007/0219910 A1 | 9/2007 | Martinez | |
| 2008/0028310 A1* | 1/2008 | Ouchi | H04L 12/2834 715/704 |
| 2008/0177822 A1 | 7/2008 | Yoneda | |
| 2008/0229215 A1 | 9/2008 | Baron et al. | |
| 2009/0087167 A1 | 4/2009 | Seisun et al. | |
| 2009/0249222 A1 | 10/2009 | Schmidt et al. | |
| 2010/0075313 A1 | 3/2010 | Kreuwel et al. | |
| 2010/0281178 A1 | 11/2010 | Sullivan | |
| 2011/0004330 A1 | 1/2011 | Rothkopf et al. | |
| 2011/0040658 A1 | 2/2011 | Gautier et al. | |
| 2011/0047566 A1 | 2/2011 | Matuchniak et al. | |
| 2011/0058675 A1 | 3/2011 | Brueck et al. | |
| 2011/0161485 A1 | 6/2011 | George et al. | |
| 2011/0307927 A1 | 12/2011 | Nakano et al. | |
| 2012/0005380 A1 | 1/2012 | Batson et al. | |
| 2012/0088477 A1 | 4/2012 | Cassidy | |
| 2012/0089910 A1 | 4/2012 | Cassidy | |
| 2012/0290932 A1 | 11/2012 | Johnson | |
| 2012/0321087 A1 | 12/2012 | Fleischman et al. | |
| 2012/0324552 A1 | 12/2012 | Padala et al. | |
| 2013/0073584 A1 | 3/2013 | Kuper et al. | |
| 2013/0174204 A1 | 7/2013 | Coburn, IV et al. | |
| 2013/0188924 A1 | 7/2013 | Morris | |
| 2013/0219178 A1 | 8/2013 | Xiques et al. | |
| 2013/0253679 A1 | 9/2013 | Lambourne | |
| 2013/0317635 A1 | 11/2013 | Bates et al. | |
| 2013/0326041 A1* | 12/2013 | Bellet | G06Q 30/0256 709/223 |
| 2014/0074959 A1 | 3/2014 | Alsina et al. | |
| 2014/0075308 A1 | 3/2014 | Sanders et al. | |
| 2014/0075513 A1 | 3/2014 | Trammel et al. | |
| 2014/0094943 A1 | 4/2014 | Bates et al. | |
| 2014/0123006 A1 | 5/2014 | Chen et al. | |
| 2014/0181107 A1 | 6/2014 | Coburn, IV et al. | |
| 2014/0189648 A1 | 7/2014 | Everitt | |
| 2014/0282772 A1 | 9/2014 | Chen et al. | |

(56) References Cited

U.S. PATENT DOCUMENTS

| | | | |
|---|---|---|---|
| 2014/0310316 | A1 | 10/2014 | Coburn, IV et al. |
| 2014/0359151 | A1* | 12/2014 | Hansen ............... H04L 65/1083 709/231 |
| 2015/0098576 | A1 | 4/2015 | Sundaresan et al. |

FOREIGN PATENT DOCUMENTS

| | | | |
|---|---|---|---|
| CN | 102215115 | A | 10/2011 |
| CN | 103812828 | A | 5/2014 |
| EP | 1389853 | A1 | 2/2004 |
| EP | 2779529 | A1 | 9/2014 |
| JP | 2002044765 | A | 2/2002 |
| JP | 2006524874 | A | 11/2006 |
| JP | 2007264922 | A | 10/2007 |
| JP | 2013247591 | A | 12/2013 |
| JP | 2016537873 | A | 12/2016 |
| WO | 200153994 | | 7/2001 |
| WO | 2003093950 | A2 | 11/2003 |
| WO | 2012115742 | | 8/2012 |
| WO | 2012137190 | A1 | 10/2012 |
| WO | 2013043958 | A2 | 3/2013 |
| WO | 2014004181 | A1 | 1/2014 |
| WO | 2014039163 | A1 | 3/2014 |
| WO | 2015031703 | A1 | 3/2015 |

OTHER PUBLICATIONS

Advisory Action mailed on Nov. 29, 2017, issued in connection with U.S. Appl. No. 14/475,093, filed Sep. 2, 2014, 14 pages.
AudioTron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Office Action, Office Action mailed on Jan. 31, 2018, issued in connection with Chinese Application No. 201580041535.6, 5 pages.
Chinese Patent Office, First Office Action with Translation mailed on Sep. 30, 2017, issued in connection with Chinese Patent Application No. 201580041499.3, 5 pages.
Chinese Patent Office, Second Office Action mailed on Apr. 20, 2018, issued in connection with Chinese Application No. 2015800415356, 3 pages.
Chinese Patent Office, Second Office Action with Translation mailed on Jan. 10, 2018, issued in connection with Chinese Patent Application No. 201580041499.3, 15 pages.
Corrected Notice of Allowability mailed on Aug. 25, 2016, issued in connection with U.S. Appl. No. 14/616,332, filed Feb. 6, 2015, 2 pages.
Corrected Notice of Allowability mailed on Nov. 29, 2016, issued in connection with U.S. Appl. No. 14/616,310, filed Feb. 6, 2015, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report mailed on May 24, 2018, issued in connection with European Application No. 15803347.2, 8 pages.
European Patent Office, European Extended Search Report mailed on Jul. 19, 2017, issued in connection with EP Application No. 15803347.2, 14 pages.
European Patent Office, European Extended Search Report mailed on Jul. 27, 2017, issued in connection with EP Application No. 15802676.5, 12 pages.

European Patent Office, European Extended Search Report mailed on Jul. 28, 2017, issued in connection with EP Application No. 15803358.9, 14 pages.
European Patent Office, European Office Action mailed on Feb. 13, 2020, issued in connection with European Application No. 15803347.2, 6 pages.
European Patent Office, European Supplemental Search Report mailed on Sep. 20, 2017, issued in connection with EP Application No. 158032227, 11 pages.
European Patent Office, Summons to Attend Oral Proceedings mailed on Jan. 13, 2021, issued in connection with European Application No. 15803347.2, 8 pages.
Final Office Action mailed on Nov. 3, 2016, issued in connection with U.S. Appl. No. 14/616,319, filed Feb. 6, 2015, 23 pages.
Final Office Action mailed on Oct. 3, 2016, issued in connection with U.S. Appl. No. 14/616,341, filed Feb. 6, 2015, 18 pages.
Final Office Action mailed on Mar. 1, 2018, issued in connection with U.S. Appl. No. 15/477,912, filed Apr. 3, 2017, 6 pages.
Final Office Action mailed on Aug. 16, 2017, issued in connection with U.S. Appl. No. 14/475,093, filed Sep. 2, 2014, 16 pages.
Final Office Action mailed on Oct. 19, 2016, issued in connection with U.S. Appl. No. 14/475,093, filed Sep. 2, 2014, 30 pages.
First Action Interview Office Action mailed on Jun. 10, 2016, issued in connection with U.S. Appl. No. 14/616,319, filed Feb. 6, 2015, 7 pages.
First Action Interview Office Action mailed on Aug. 18, 2016, issued in connection with U.S. Appl. No. 14/485,602, filed Sep. 12, 2014, 15 pages.
International Bureau, International Preliminary Report on Patentability mailed on Dec. 15, 2016, issued in connection with International Application No. PCT/US2015/031756, filed on May 20, 2015, 9 pages.
International Bureau, International Preliminary Report on Patentability mailed on Dec. 15, 2016, issued in connection with International Application No. PCT/US2015/031930, filed on May 21, 2015, 9 pages.
International Bureau, International Preliminary Report on Patentability mailed on Dec. 15, 2016, issued in connection with International Application No. PCT/US2015/033003, filed on May 28, 2015, 17 pages.
International Bureau, International Preliminary Report on Patentability mailed on Dec. 15, 2016, issued in connection with International Application No. PCT/US2015/033008, filed on May 28, 2015, 16 pages.
International Searching Authority, International Search Report and Written Opinion mailed on Sep. 7, 2015, issued in connection with International Application No. PCT/US2015/033008, filed on May 28, 2015, 19 pages.
International Searching Authority, International Search Report and Written Opinion mailed on Aug. 12, 2015, issued in connection with International Application No. PCT/US2015/031930, filed on May 21, 2015, 12 pages.
International Searching Authority, International Search Report and Written Opinion mailed on Jul. 20, 2015, issued in connection with International Application No. PCT/US2015/031756, filed on May 20, 2015, 12 pages.
International Searching Authority, International Search Report and Written Opinion mailed on Aug. 27, 2015, issued in connection with International Application No. PCT/US2015/033003, filed on May 28, 2015, 20 pages.
Japanese Patent Office, Office Action mailed on May 9, 2017, issued in connection with Japanese Patent Application No. 2016-570965, 7 pages.
Japanese Patent Office, Office Action mailed on Jun. 13, 2017, issued in connection with Japanese patent application No. 2016-571113, 5 pages.
Japanese Patent Office, Translation of Office Action mailed on May 9, 2017, issued in connection with Japanese Patent Application No. 2016-570965, 4 pages.
Japanese Patent Office, Translation of Office Action mailed on Jun. 13, 2017, issued in connection with Japanese Patent Application No. 2016-571113, 2 pages.

(56) References Cited

OTHER PUBLICATIONS

Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Feb. 1, 2017, issued in connection with U.S. Appl. No. 14/616,319, filed Feb. 6, 2015, 26 pages.
Non-Final Office Action mailed on Aug. 9, 2017, issued in connection with U.S. Appl. No. 15/288,754, filed Oct. 7, 2016, 14 pages.
Non-Final Office Action mailed on May 1, 2017, issued in connection with U.S. Appl. No. 14/475,093, filed Sep. 2, 2014, 10 pages.
Non-Final Office Action mailed on Jul. 10, 2017, issued in connection with U.S. Appl. No. 15/477,912, filed Apr. 3, 2017, 7 pages.
Non-Final Office Action mailed on Sep. 12, 2016, issued in connection with U.S. Appl. No. 14/475,093, filed Sep. 2, 2014, 26 pages.
Non-Final Office Action mailed on Apr. 14, 2020, issued in connection with U.S. Appl. No. 16/657,846, filed Oct. 18, 2019, 18 pages.
Non-Final Office Action mailed on Apr. 17, 2018, issued in connection with U.S. Appl. No. 15/099,813, filed Apr. 15, 2016, 13 pages.
Non-Final Office Action mailed on Nov. 17, 2021, issued in connection with U.S. Appl. No. 17/146,065, filed Jan. 11, 2021, 12 pages.
Non-Final Office Action mailed on Oct. 17, 2016, issued in connection with U.S. Appl. No. 15/099,846, filed Aug. 15, 2016, 6 pages.
Non-Final Office Action mailed on Sep. 23, 2016, issued in connection with U.S. Appl. No. 15/130,672, filed Apr. 15, 2016, 6 pages.
Non-Final Office Action mailed on Dec. 26, 2018, issued in connection with U.S. Appl. No. 15/592,484, filed May 11, 2017, 18 pages.
Notice of Allowance mailed on Dec. 1, 2016, issued in connection with U.S. Appl. No. 14/616,341, filed Feb. 6, 2015, 5 pages.
Notice of Allowance mailed on Jul. 1, 2016, issued in connection with U.S. Appl. No. 14/616,310, filed Feb. 6, 2015, 9 pages.
Notice of Allowance mailed on Jan. 3, 2017, issued in connection with U.S. Appl. No. 15/099,846, filed Apr. 15, 2016, 5 pages.
Notice of Allowance mailed on Jan. 3, 2017, issued in connection with U.S. Appl. No. 15/130,672, filed Apr. 15, 2016, 5 pages.
Notice of Allowance mailed on Jan. 5, 2017, issued in connection with U.S. Appl. No. 14/616,332, filed Feb. 6, 2015, 5 pages.
Notice of Allowance mailed on Apr. 7, 2016, issued in connection with U.S. Appl. No. 14/616,325, filed Feb. 6, 2015, 5 pages.
Notice of Allowance mailed on Apr. 8, 2016, issued in connection with U.S. Appl. No. 14/616,364, filed Feb. 6, 2015, 6 pages.
Notice of Allowance mailed on Sep. 1, 2020, issued in connection with U.S. Appl. No. 16/657,846, filed Oct. 18, 2019, 9 pages.
Notice of Allowance mailed on Mar. 10, 2017, issued in connection with U.S. Appl. No. 14/616,341, filed Feb. 6, 2015, 5 pages.
Notice of Allowance mailed on May 17, 2017, issued in connection with U.S. Appl. No. 14/616,319, filed Feb. 6, 2015, 9 pages.
Notice of Allowance mailed on Jul. 18, 2016, issued in connection with U.S. Appl. No. 14/616,332, filed Feb. 6, 2015, 7 pages.
Notice of Allowance mailed on Mar. 20, 2017, issued in connection with U.S. Appl. No. 14/485,602, filed Sep. 12, 2014, 9 pages.
Notice of Allowance mailed on Jan. 23, 2018, issued in connection with U.S. Appl. No. 15/288,754, filed Oct. 7, 2016, 5 pages.
Notice of Allowance mailed on Nov. 23, 2016, issued in connection with U.S. Appl. No. 14/485,602, filed Sep. 12, 2014, 9 pages.
Notice of Allowance mailed on Nov. 27, 2017, issued in connection with U.S. Appl. No. 15/297,995, filed Oct. 19, 2016, 5 pages.
Notice of Allowance mailed on Mar. 28, 2022, issued in connection with U.S. Appl. No. 17/146,065, filed Jan. 11, 2021, 9 pages.
Notice of Allowance mailed on Jun. 4, 2019, issued in connection with U.S. Appl. No. 15/592,484, filed May 11, 2017, 9 pages.
Palm, Inc., "Handbook for the Palm VII Handheld," May 2000, 311 pages.
Pre-Interview First Office Action mailed on Apr. 6, 2016, issued in connection with U.S. Appl. No. 14/616,341, filed Feb. 6, 2015, 4 pages.
Preinterview First Office Action mailed on Jul. 15, 2016, issued in connection with U.S. Appl. No. 14/485,602, filed Sep. 12, 2014, 6 pages.
Preinterview First Office Action mailed on Apr. 20, 2016, issued in connection with U.S. Appl. No. 14/616,310, filed Feb. 6, 2015, 21 pages.
Preinterview First Office Action mailed on Apr. 21, 2016, issued in connection with U.S. Appl. No. 14/616,332, filed Feb. 6, 2015, 20 pages.
Pre-Interview First Office Action mailed on Feb. 23, 2016, issued in connection with U.S. Appl. No. 14/616,364, filed Feb. 6, 2015, 5 pages.
Pre-Interview First Office Action mailed on Feb. 24, 2016, issued in connection with U.S. Appl. No. 14/616,325, filed Feb. 6, 2015, 5 pages.
Pre-Interview First Office Action mailed on Mar. 29, 2016, issued in connection with U.S. Appl. No. 14/616,319, filed Feb. 6, 2015, 5 pages.
Presentations at WinHEC 2000, May 2000, 138 pages.
Seong et al. PrPI Mobile Cloud Computing and Services: Social Networks and Beyond (MCS), Jun. 15, 2010, 8 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

PRIORITIZING MEDIA CONTENT REQUESTS

CROSS-REFERENCE TO RELATED APPLICATIONS

This application claims priority under 35 U.S.C. § 120 to, and is a continuation of, U.S. non-provisional patent application Ser. No. 17/146,065, filed on Jan. 11, 2021, entitled "Prioritizing Media Content Requests," and issued as U.S. Pat. No. 11,409,496 on Aug. 9, 2022, which is incorporated herein by reference in its entirety.

U.S. non-provisional patent application Ser. No. 17/146,065 claims priority under 35 U.S.C. § 120 to, and is a continuation of, U.S. non-provisional patent application Ser. No. 16/657,846, filed on Oct. 18, 2019, entitled "Prioritizing Media Content Requests," and issued as U.S. Pat. No. 10,891,104 on Jan. 12, 2021, which is incorporated herein by reference in its entirety.

U.S. non-provisional patent application Ser. No. 16/657,846 claims priority under 35 U.S.C. § 120 to, and is a continuation of, U.S. non-provisional patent application Ser. No. 15/592,484, filed on May 11, 2017, entitled "Prioritizing Media Content Requests," and issued as U.S. Pat. No. 10,452,343 on Oct. 22, 2019, which is incorporated herein by reference in its entirety.

U.S. non-provisional patent application Ser. No. 15/592,484 claims priority under 35 U.S.C. § 120 to, and is a continuation of, U.S. non-provisional patent application Ser. No. 14/485,602, filed on Sep. 12, 2014, entitled "Prioritizing Media Content Requests," and issued as U.S. Pat. No. 9,720,642 on Aug. 1, 2017, which is incorporated herein by reference in its entirety.

U.S. non-provisional patent application Ser. No. 14/485,602 claims the benefit under 35 U.S.C. § 119 of U.S. Provisional Patent Application No. 62/027,215, filed Jul. 21, 2014, the contents of which are incorporated herein by reference in their entirety.

U.S. non-provisional patent application Ser. No. 14/485,602 also claims the benefit under 35 U.S.C. § 119 of U.S. Provisional Patent Application No. 62/007,906, filed Jun. 4, 2014, the contents of which are incorporated herein by reference in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
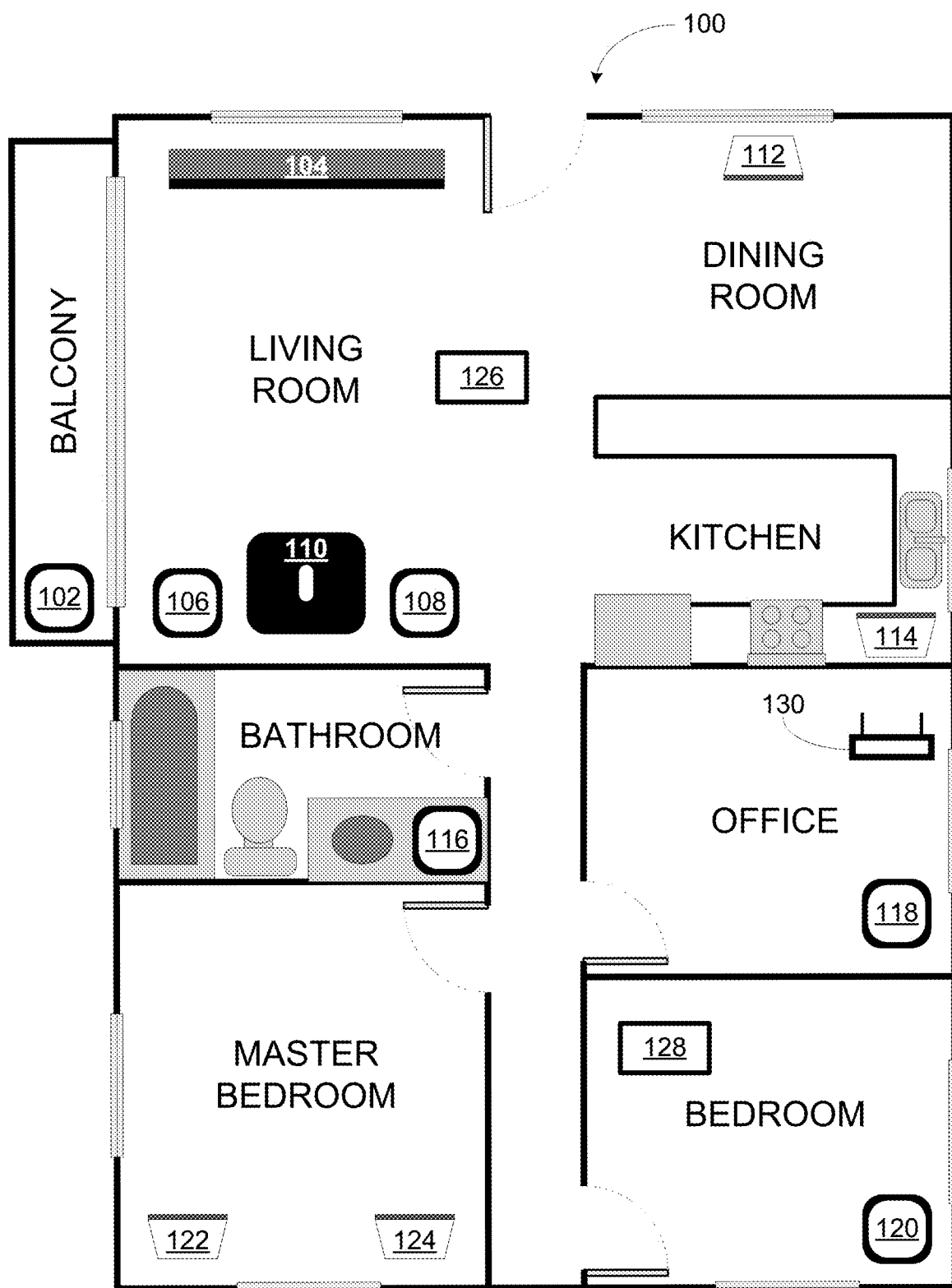
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In some situations, a service provider may limit a quantity of media streams that a given account may simultaneously stream to media playback devices that are associated with the given account. Disclosed herein are (i) example methods by which a computing system associated with the media service provider may determine whether to provide media content requested by the media playback devices and (ii) example methods by which the media playback devices may provide information to be used by the computing system (e.g., a server or another media playback device) in making such determinations.

For example, an account of a service provider may be limited to one stream at a time. In an example situation, the account may be associated with a first playback device and a second playback device. That is, the first and second media playback devices may authenticate with the computing system using login credentials associated with the account. In some examples, the first playback device may send to the computing system a first request to receive first media content. The second playback device may send to the computing system a second request to receive second media content. In some cases, the computing system may send the first media content to the first playback device such that the first playback device finishes or otherwise stops playback of the first media content before the second request is received by the computing system. In other examples, the first request and the second request may be received by the computing system simultaneously, or the second request may be received while the computing device is sending the first media content to the first playback device.

Thus, multiple requests that may otherwise result in several playback devices associated with the account simultaneously receiving media content for playback may conflict with the limit of one stream placed on the account. In this case, the computing system may determine whether to send (or continue sending) the first media content to the first playback device, or alternatively, to send the second media content to the second media playback device.

In one example, the first and second requests may respectively include information characterizing first and second playback operations associated with the first and second requests. For instance, the first playback device may receive a command (e.g., from a control device) to play back first media content immediately, and then the first playback device may request the computing system to send the first media content to the first playback device.

Alternatively, while executing playback of a queue of multiple items of media content that includes the second media content, the second playback device may determine that playback of media content preceding the second media content in the queue may be nearing an end. Then, the second playback device may send the second request for the second media content to the computing system so that the second playback device may play back the second media content in accordance with the queue. In such a situation, the computing system may determine that the first request should be fulfilled instead of the second request, because the first request may represent a playback operation associated with a command more recently received than that of the second playback operation.

In another example, the first playback device may be included in a first group of playback devices that includes one or more playback devices and the second playback device may be included in a second group of playback devices that also includes one or more playback devices. Here, the first request may indicate a time at which a playback command was last received by any playback device of the first group of playback devices and the second request may indicate a time at which a playback command was last received by any playback device of the second group of playback devices. Then, the computing system may provide the first media content to the first playback device instead of providing the second media content to the second playback device, because the command to play the first media content immediately was more recently received than the command to play back the second media content after playing other media content preceding the second media content in the playback queue.

In one aspect, a method is provided. The method involves detecting, by a media playback system, a command for at least one playback device of the media playback system to perform a sequence of one or more playback operations; and sending, by the media playback system to a computing system, a request for media content related to at least one playback operation of the sequence of one or more playback operations, where the request includes information characterizing the at least one playback operation.

In another aspect, a non-transitory computer-readable medium is provided. The non-transitory computer-readable medium has stored thereon instructions executable by a media playback system to cause the media playback system to perform functions. The functions include detecting a command for at least one playback device of the media playback system to perform a sequence of one or more playback operations; and sending, to a computing system, a request for media content related to at least one playback operation of the sequence of one or more playback operations, where the request includes information characterizing the at least one playback operation.

In yet another aspect, a media playback system is provided. The media playback system includes a processor and a non-transitory computer-readable medium storing instructions that when executed by the media playback system cause the media playback system to perform functions comprising: detecting a command for at least one playback device of the media playback system to perform a sequence of one or more playback operations; and sending, to a computing system, a request for media content related to at least one playback operation of the sequence of one or more playback operations, where the request includes information characterizing the at least one playback operation.

In another aspect, a method is provided. The method involves detecting, by a media playback system, a playback command for at least one playback device of the media playback system to perform a sequence of one or more playback operations; and sending, by the media playback system to a computing system, a request for media content related to at least one playback operation of the sequence of one or more playback operations, where the request indicates a time that a playback command was last detected by any of the at least one playback devices.

In yet another aspect, a non-transitory computer-readable medium is provided. The non-transitory computer-readable medium has stored thereon instructions executable by a media playback system to cause the media playback system to perform functions. The functions include detecting a playback command for at least one playback device of the media playback system to perform a sequence of one or more playback operations; and sending, to a computing system, a request for media content related to at least one playback operation of the sequence of one or more playback operations, where the request indicates a time that a playback command was last detected by any of the at least one playback devices.

In another aspect, a media playback system is provided. The media playback system includes a processor and a computer-readable medium storing instructions that when executed by the media playback system cause the media playback system to perform functions comprising: detecting a playback command for at least one playback device of the media playback system to perform a sequence of one or more playback operations; and sending, to a computing system, a request for media content related to at least one playback operation of the sequence of one or more playback operations, where the request indicates a time that a playback command was last detected by any of the at least one playback devices.

In another aspect, the disclosure includes a method that comprises receiving, by a computing system from a first playback device, a first request for first media content, where the first request includes information characterizing a first playback operation and the first playback device is associated with an account of the media service provider, and where the computing system is associated with a media service provider; receiving, by the computing system from a second playback device, a second request for second media content, where the second request includes information characterizing a second playback operation and the second playback device is associated with the account of the media service provider; determining, by the computing system, that the first playback operation has a higher priority than the second playback operation based on the received information characterizing the first playback operation and the received information characterizing the second playback operation; and after determining that the first playback operation has a higher priority, sending, by the computing system, the first media content to the first playback device.

In yet another aspect, a non-transitory computer-readable medium is provided. The non-transitory computer-readable medium has stored thereon instructions executable by a computing system to cause the computing system to perform functions. The computing system is associated with a media service provider. The functions include receiving, from a first playback device, a first request for first media content, where the first request includes information characterizing a first playback operation and the first playback device is associated with an account of the media service provider; receiving, from a second playback device, a second request for second media content, where the second request includes information characterizing a second playback operation and the second playback device is associated with the account of the media service provider; determining that the first playback operation has a higher priority than the second playback operation based on the received information characterizing the first playback operation and the received information characterizing the second playback operation; and after determining that the first playback operation has a higher priority, sending the first media content to the first playback device.

In yet another aspect, a computing system associated with a media service provider is provided. The computing system includes a processor and a computer-readable medium storing instructions that when executed by the computing system cause the computing device to perform functions comprising: receiving, from a first playback device, a first request for first media content, where the first request includes information characterizing a first playback operation and the first playback device is associated with an account of the media service provider; receiving, from a second playback device, a second request for second media content, where the second request includes information characterizing a second playback operation and the second playback device is associated with the account of the media service provider; determining that the first playback operation has a higher priority than the second playback operation based on the received information characterizing the first playback operation and the received information characterizing the second playback operation; and after determining that the first playback operation has a higher priority, sending the first media content to the first playback device.

In another aspect, the disclosure includes a method that comprises receiving, by a computing system associated with a media service provider from a first playback device associated with an account of the media service provider, a first request for first media content related to a first playback operation, where the first request indicates a time that a playback command was last received by any playback device of a first group of one or more playback devices that includes the first playback device; receiving, by the computing system from a second playback device associated with the account, a second request for second media content related to a second playback operation, where the second request indicates a time that a playback command was last received by any playback device of a second group of one or more playback devices that includes the second playback device; determining that the first group received a playback command more recently than the second group; and sending the first media content to the first playback device.

In yet another aspect, a non-transitory computer-readable medium is provided. The non-transitory computer-readable medium has stored thereon instructions executable by a computing system to cause the computing system to perform functions. The computing system is associated with a media service provider. The functions include receiving, from a first playback device associated with an account of the media service provider, a first request for first media content related to a first playback operation, where the first request indicates a time that a playback command was last received by any playback device of a first group of one or more playback devices that includes the first playback device; receiving, from a second playback device associated with the account, a second request for second media content related to a second playback operation, where the second request indicates a time that a playback command was last received by any playback device of a second group of one or more playback devices that includes the second playback device; determining that the first group received a playback command more recently than the second group; and sending the first media content to the first playback device.

In yet another aspect, a computing system associated with a media service provider is provided. The computing system includes a processor and a computer-readable medium storing instructions that when executed by the computing system cause the computing device to perform functions comprising: receiving, from a first playback device associated with an account of the media service provider, a first request for first media content related to a first playback operation, where the first request indicates a time that a playback command was last received by any playback device of a first group of one or more playback devices that includes the first playback device; receiving, from a second playback device associated with the account, a second request for second media content related to a second playback operation, where the second request indicates a time that a playback command was last received by any playback device of a second group of one or more playback devices that includes the second playback device; determining that the first group received a playback command more recently than the second group; and sending the first media content to the first playback device.

In yet another aspect, a method is provided that includes receiving, by a computing system from a playback device, a request for media content, where the request includes information characterizing a playback operation and the playback device is associated with an account of the media service provider; determining whether to provide the media content based on the received information characterizing the playback operation; and sending the media content to the playback device.

In yet another aspect, a non-transitory computer-readable medium is provided. The non-transitory computer-readable medium has stored thereon instructions executable by a computing system to cause the computing system to perform functions. The computing system is associated with a media service provider. The functions include receiving, from a playback device, a request for media content, where the request includes information characterizing a playback operation and the playback device is associated with an account of the media service provider; determining whether to provide the media content based on the received information characterizing the playback operation; and sending the media content to the playback device.

In yet another aspect, a computing system associated with a media service provider is provided. The computing system includes a processor and a computer-readable medium storing instructions that when executed by the computing system cause the computing device to perform functions comprising: receiving, from a playback device, a request for media content, where the request includes information characterizing a playback operation and the playback device is associated with an account of the media service provider; determining whether to provide the media content based on the received information characterizing the playback operation; and sending the media content to the playback device.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
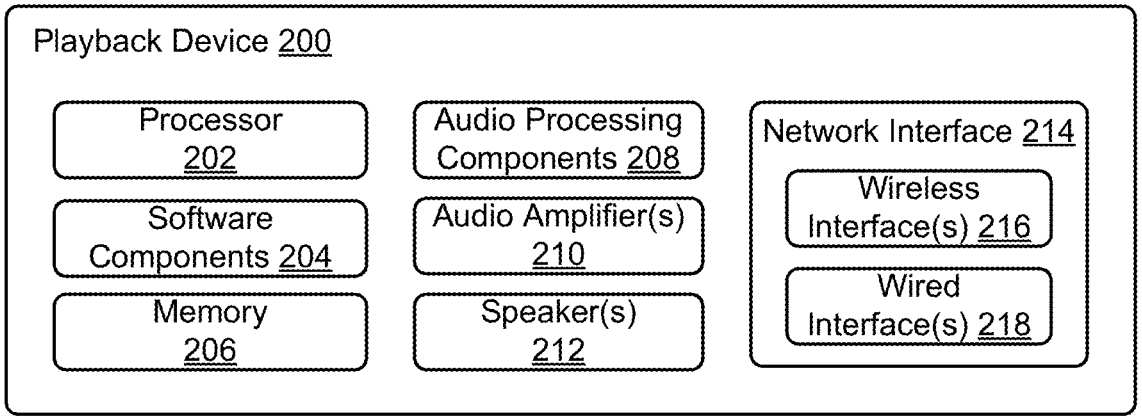
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
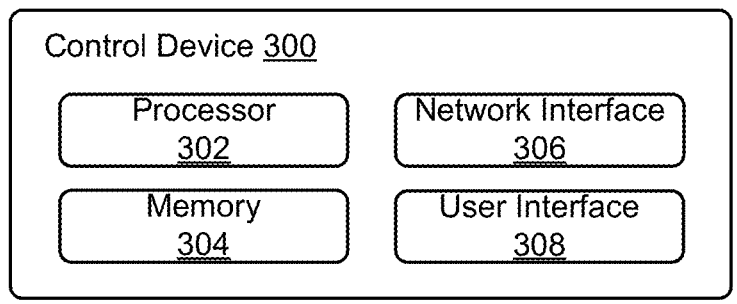
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
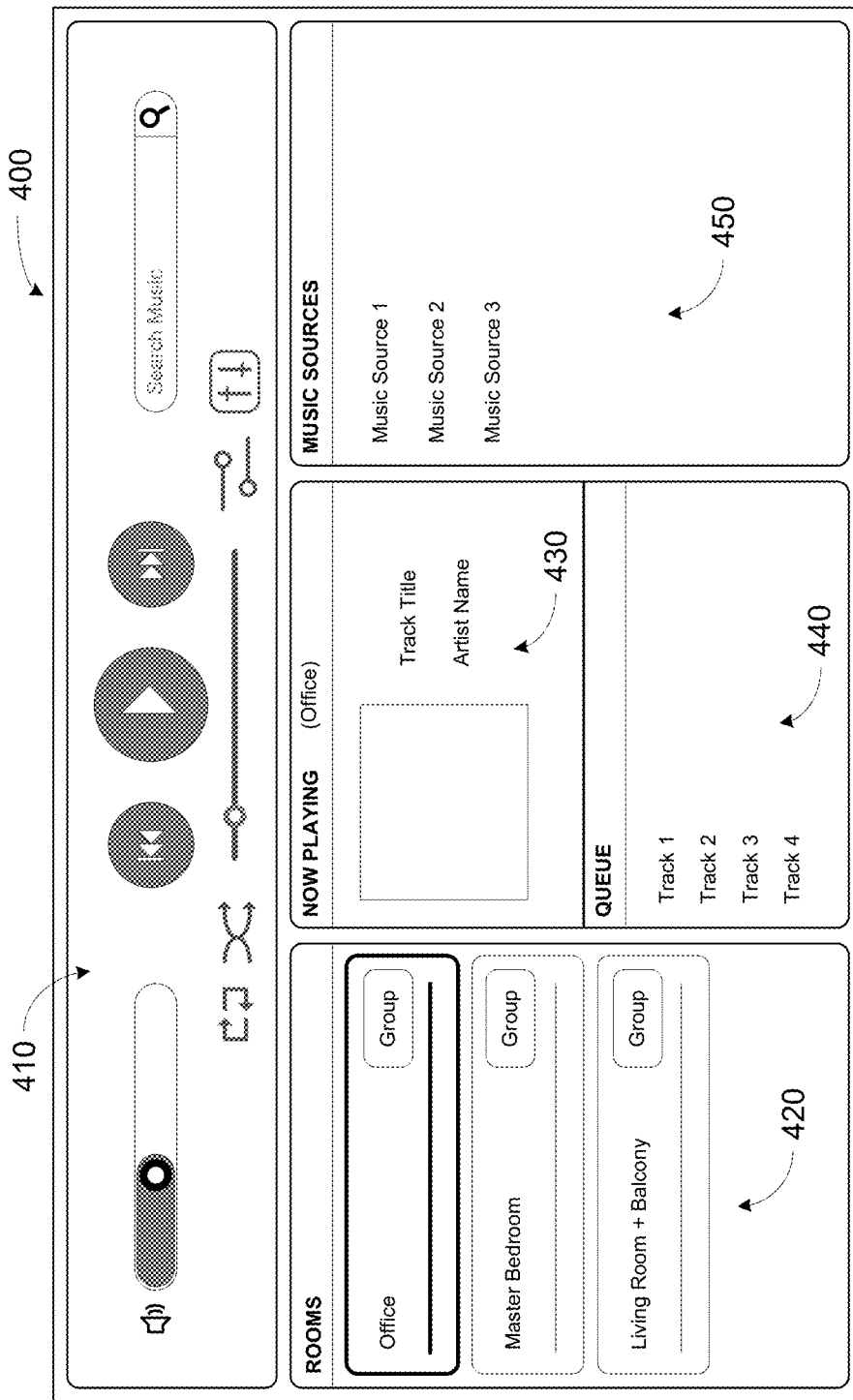
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Methods and Systems for Prioritizing Media Content Requests

Figure 5:
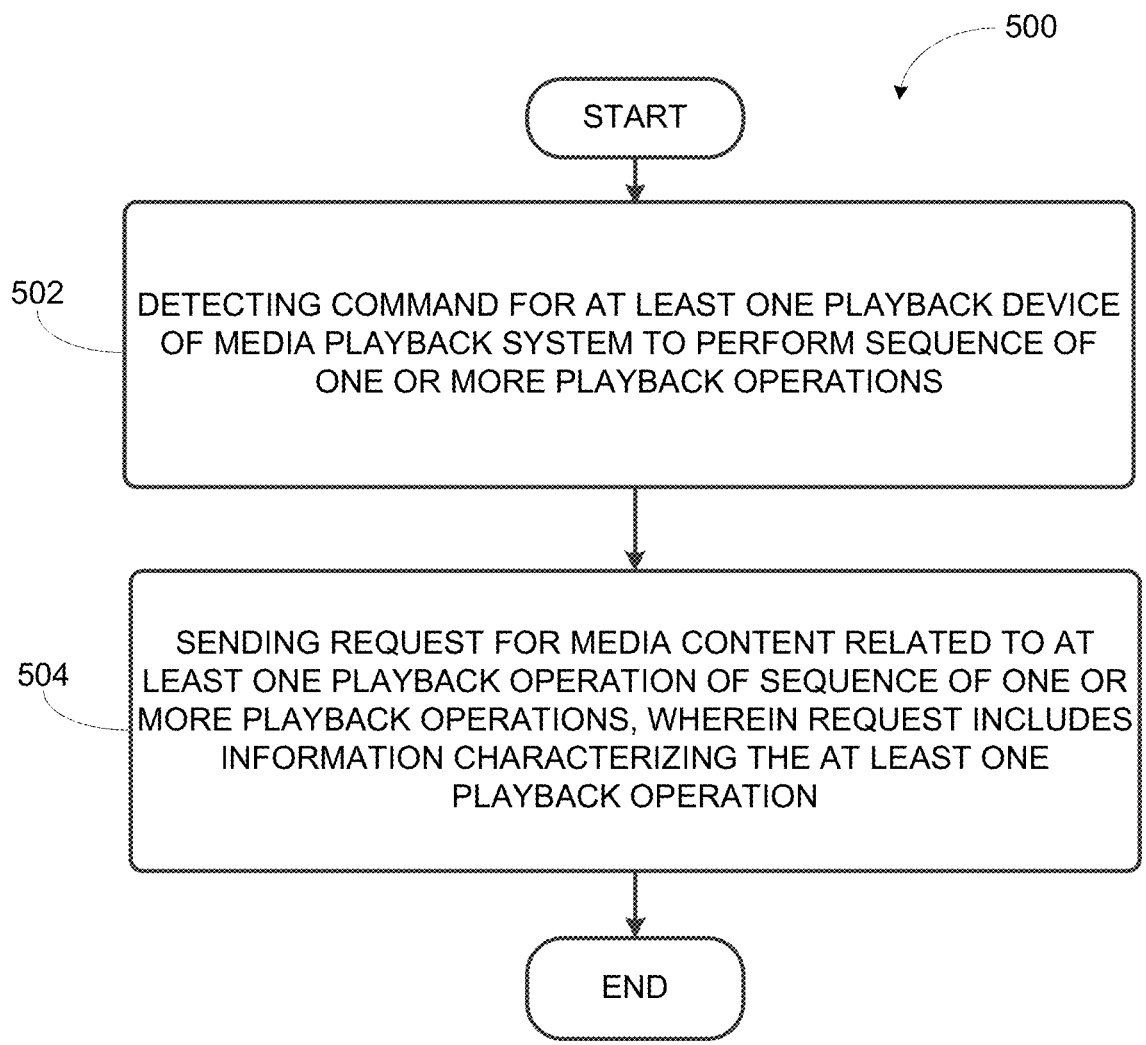
FIG. 5 shows an example flow diagram of an example method.
Figure 6A:
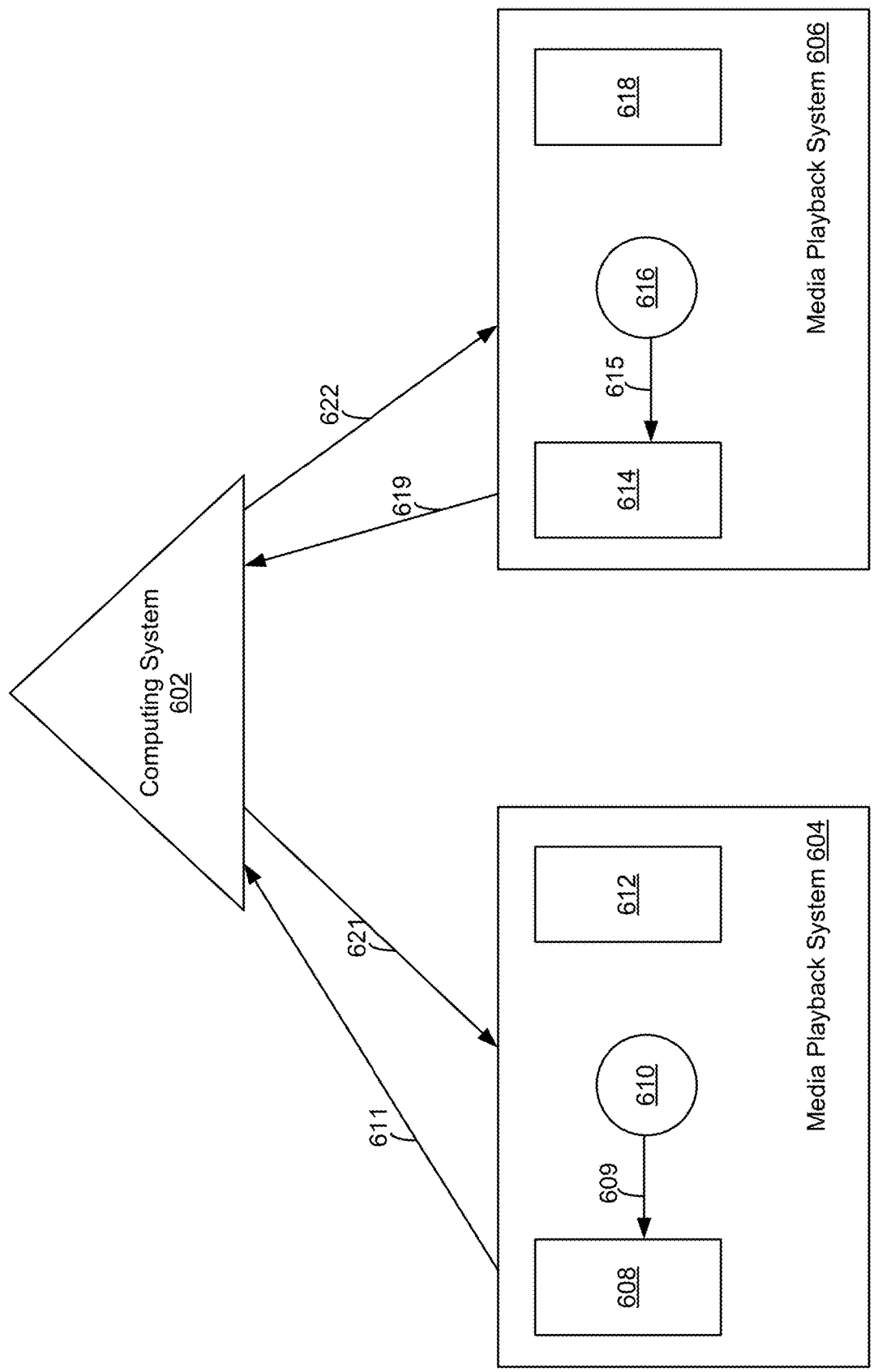
FIG. 6A shows example devices and systems for practicing example methods.
Figure 6B:
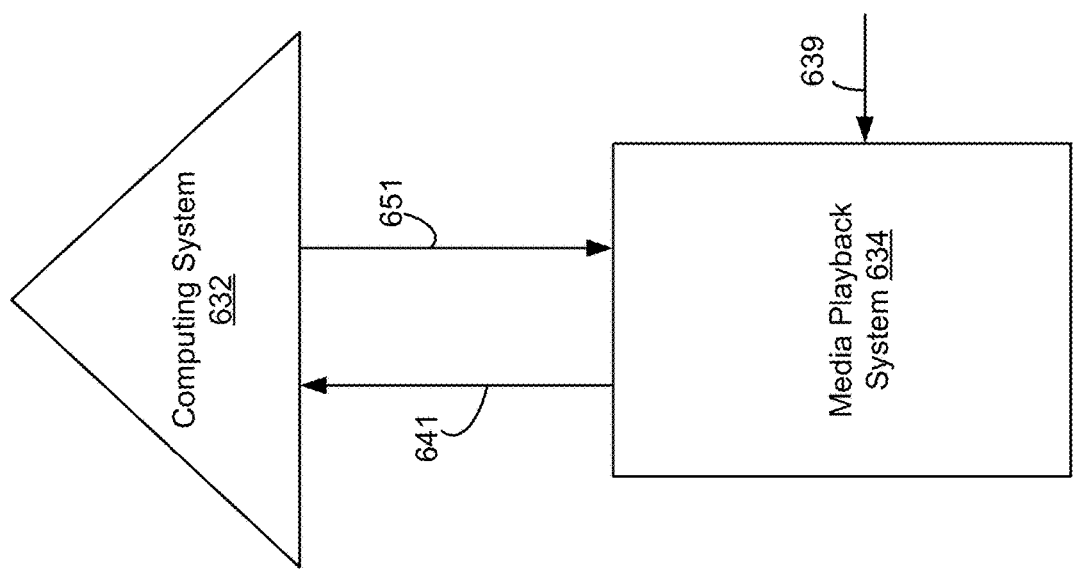
FIG. 6B shows example devices and systems for practicing example methods.
Figure 6C:
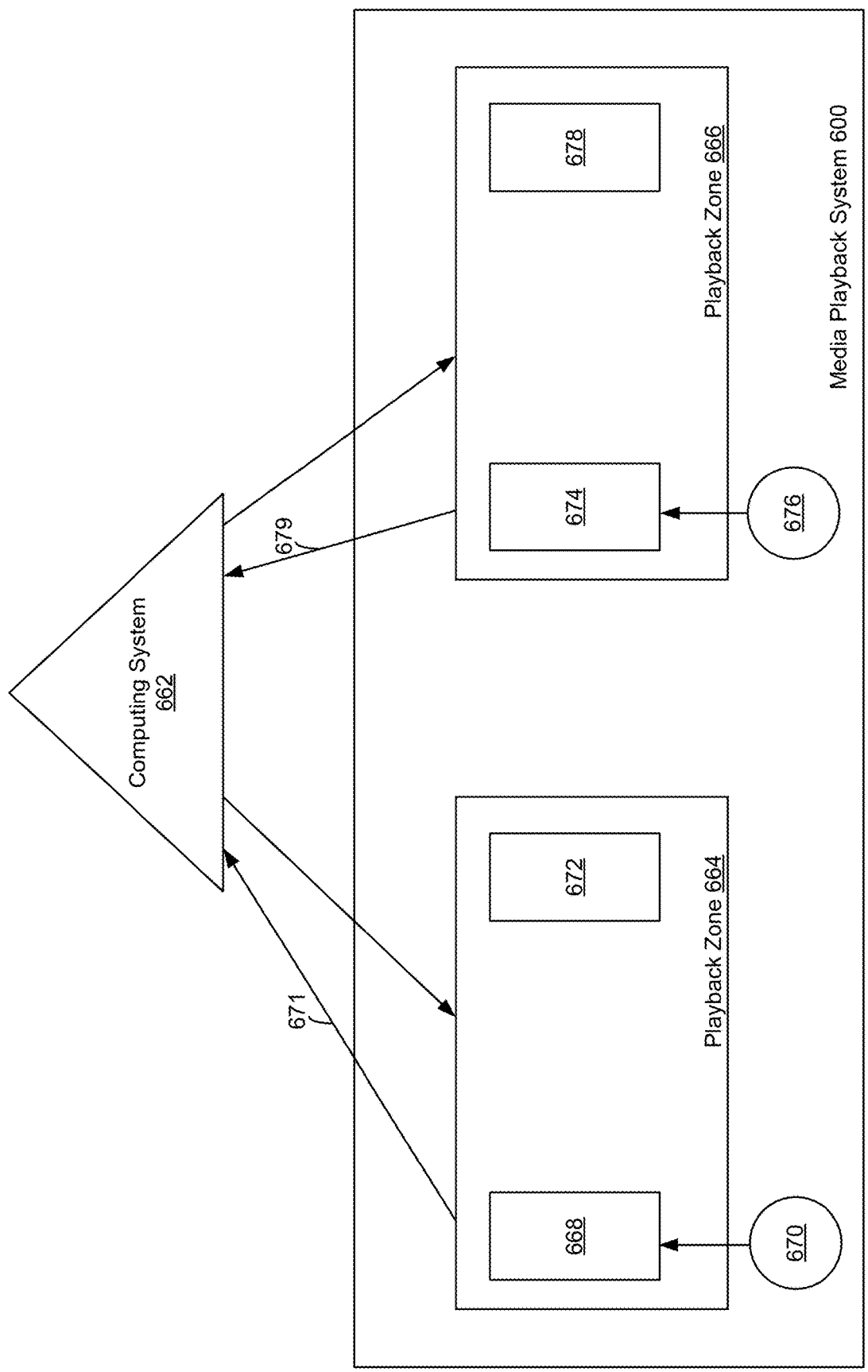
FIG. 6C shows example devices and systems for practicing example methods.

Referring now to FIGS. 5, 9, 10, 11, and 12, methods 500, 900, 1000, 1100, and 1200 present example methods that may be implemented within an operating environment involving, for example, one or more instances of the media playback system 100 of FIG. 1, one or more of the playback device 200 of FIG. 2, one or more of the control device 300 of FIG. 3, or any of the devices or systems depicted in FIGS. 6A, 6B, and 6C. Methods 500, 900, 1000, 1100, and 1200 may include one or more operations, functions, or actions as illustrated by one or more of blocks 502-504, 902-904, 1002-1008, 1102-1108, and 1202-1206.

In addition, for the methods 500, 900, 1000, 1100, and 1200, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 500, 900, 1000, 1100, and 1200 and other processes and methods disclosed herein, each block shown in the FIGS. 5, 9, 10, 11, and 12 may represent circuitry that is wired to perform the specific logical functions in the process. Moreover, although the blocks are illustrated in sequential order, these blocks may also be performed in parallel, and/or in a different order than those described herein. Also, the various blocks may be combined into fewer blocks, divided into additional blocks, and/or removed based upon the desired implementation.

Referring now to FIG. 5, at block 502, the method 500 includes detecting, by a media playback system, a command for at least one playback device of the media playback system to perform a sequence of one or more playback operations. Referring to FIG. 6A as an example, a media playback system 604 (e.g., playback device 608) may detect a command 609 sent by a control device 610. In another example, the command may be forwarded from a playback device 612 to be detected by the playback device 608. The command 609 may include a command for the media playback system 604 to perform a sequence of playback operations represented by sequence 700 of FIG. 7.

A media playback system 606 (e.g., playback device 614) may also detect a command 615 sent from a control device 616. In another example, the command may be forwarded from a playback device 618 to be detected by the playback device 614. The command 615 may include a command for the media playback system 606 to perform a sequence of playback operations represented by sequence 800 of FIG. 8.

Devices respectively included within the media playback systems 604 and 606 may be at the same general location (e.g., a home or business setting) or may be at different locations. Any device of the media playback systems 604 and 606 may be authenticated ("signed-in") or otherwise configured to communicate with the computing system 602 using login credentials associated with an account of a media service provider.

In various examples, the detected commands 609 and 615 may include a command (or a series of commands) to immediately: (i) play back media content, (ii) play back media content and subsequently play back other media content in a specified sequence, (iii) play an internet radio stream, (iv) skip ahead to play back media content that is next to be played in a playback queue, (v) skip ahead to play back media content that is included in the playback queue but not next to be played back according to the playback queue, (vi) skip back to play back media content that precedes currently playing media content in the playback queue, or (vii) join a zone of playback device(s) to synchronously play back media content that the playback device(s) of the zone are currently playing back. The detected command may also include a command to initiate performance of any of items i-vii at a time in the future (e.g., an alarm). Other examples of playback commands are possible.

In an example depicted in FIG. 6B, a media playback system may be a standalone computing device instead of a group of devices that includes (i) at least one playback device and (ii) at least one control device as shown in FIG. 6A. For instance, media playback system 634 may be a smartphone, a tablet computer, a laptop computer, or a desktop computer. The media playback system 634 may include speakers or another audio output device configured to provide audible playback of media content 651 received from the computing system 632. Instead of receiving a command from a control device, the media playback system 634 may receive the command 639 via a user-interface, such as a touchscreen, a keyboard, a mouse, or the like. The computing system 632 may send media content 651 to the media playback system 634 in response to the media playback system 634 sending the request 641 to the computing system 632 (see description related to block 504 below for more detail about the request 641).

In another example depicted in FIG. 6C, playback devices 668 and 672 may be part of a first playback zone 664 and playback devices 674 and 678 may be part of a second playback zone 666. Both the first playback zone 664 and the second playback zone 666 may be included within a media playback system 600. In this case, the request 671 may indicate that the first playback operation is to be carried out by one or more playback devices of the first playback zone 664, whereas the request 679 may indicate that the second playback operation is to be carried out by one or more playback devices of the second playback zone 666 (see description of blocks 1002 and 1004 below for more details about example requests sent by playback devices). Also shown in FIG. 6C is the computing system 662, as well as the control devices 670 and 676.

Figure 7:
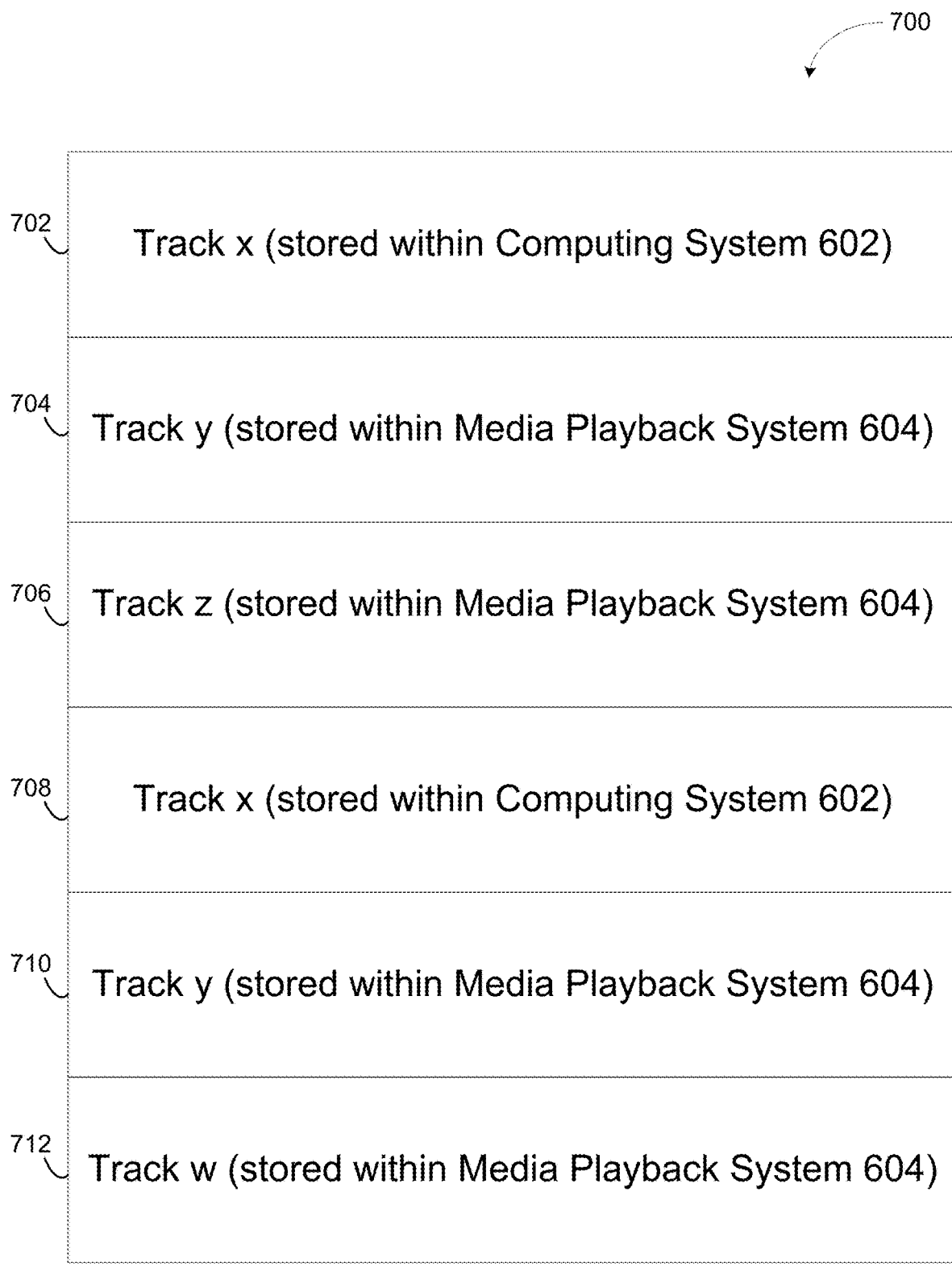
FIG. 7 shows an example sequence of playback operations.

Referring to FIG. 7 as an example, the sequence 700 of playback operations 702-712 is shown. The sequence 700 may be indicated by the command 609 detected by the media playback system 604 and be defined by first playing back "Track x" at 702, then playing back "Track y" at 704, then playing back "Track z" at 706, then playing back "Track x"

again at 708, then playing back "Track y" again at 710, and lastly playing back "Track w" at 712. In this example, the media playback system 604 may request to receive "Track x" from the computing system 602 because "Track x" might not be stored within the media playback system 604.

Figure 8:
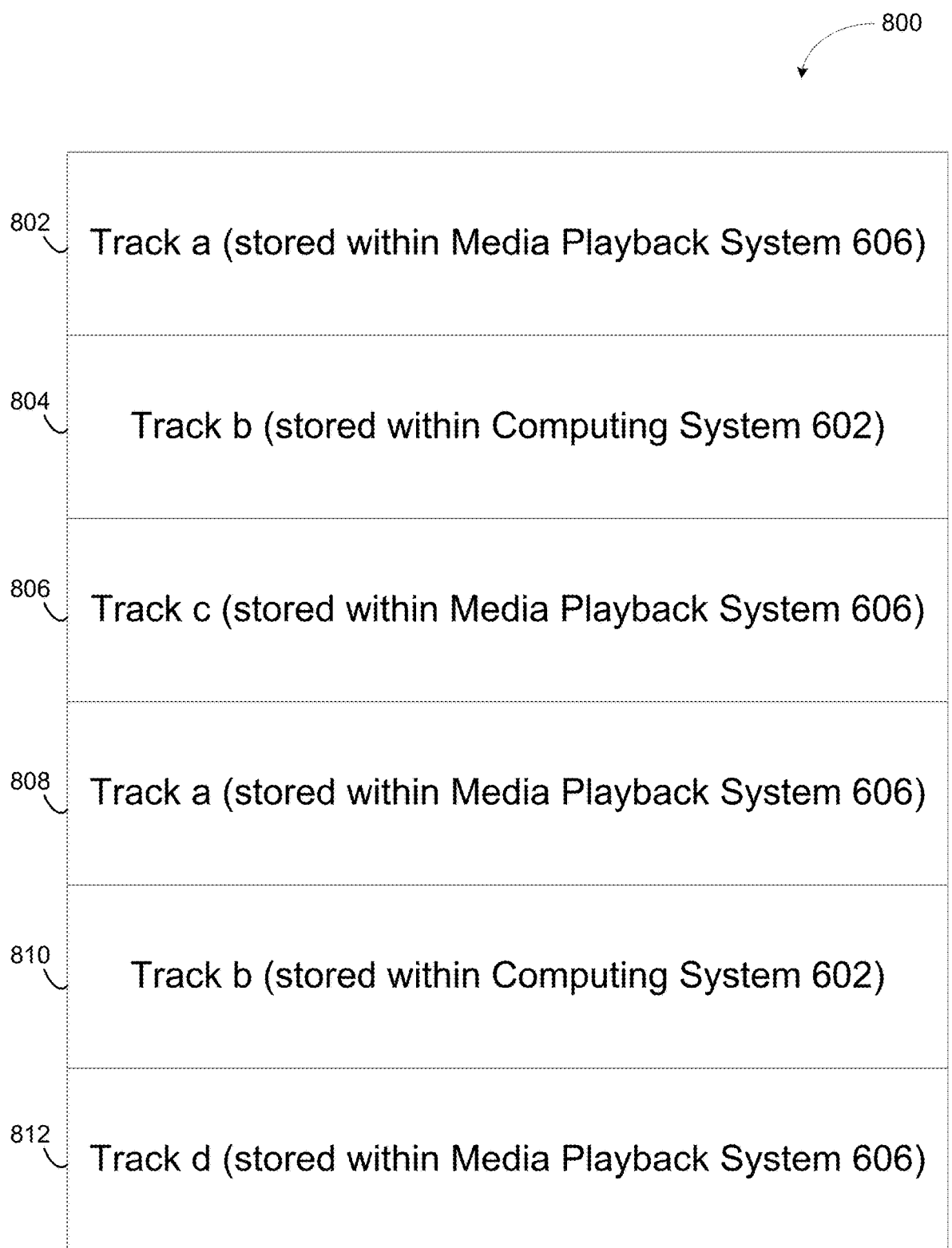
FIG. 8 shows an example sequence of playback operations.

Referring to FIG. 8 as another example, a sequence 800 of playback operations 802-812 is shown. The sequence 800 may be indicated by the command 615 detected by the media playback system 606 and be defined by first playing back "Track a" at 802, then playing back "Track b" at 804, then playing back "Track c" at 806, then playing back "Track a" again at 808, then playing back "Track b" again at 810, and lastly playing back "Track d" at 812. In this example, the media playback system 606 may need to request to receive "Track b" from the computing system 602 because "Track b" might not be stored within the media playback system 606.

At block 504, the method 500 includes sending, by the media playback system to a computing system, a request for media content related to at least one playback operation of the sequence of one or more playback operations, where the request includes information characterizing the at least one playback operation. Referring to FIG. 6A as an example, the media playback system 604 (e.g., playback device 608) may send the request 611 to the computing system 602. The media playback system 606 (e.g., playback device 614) may also send a request 619 to the computing system 602.

The computing system 602 may include a server, a general-purpose computing device, or any networked collection of servers and/or general-purpose computing devices. In one example, the computing system 602 may be associated with a media service provider and may have access to various media content requested by the media playback systems 604 and 606. In some examples, the computing system 602 may be another playback device that serves as a gateway communicatively coupling (i) a computing system associated with the media service provider and (ii) playback devices 608, 612, 614, or 618.

The request 611 may include information that explicitly or implicitly indicates a priority level associated with the at least one playback operation that is related to the media content requested by the media playback system 604. For example, the request 611 may indicate that the playback operation 702 related to the media content 621 (e.g., "Track x") requested by the media playback system 604 is a playback operation that is to be performed first in the sequence 700 of playback operations indicated by command 609. In some examples, the sequence may include only one playback operation that is considered a first playback operation of the sequence by default.

Playback operations that are to be executed first in a sequence of playback operations may be considered "high priority" based on an inference that a user considers such playback operations to be "high priority." Such "high priority" or "explicit" playback commands may include a "play now" operation (e.g., immediately playing back a given track, a first track of an album, a first track of a playlist, or an internet radio stream), a "next" operation (e.g., playing the next track in a playback queue), a "back" operation (e.g., playing the previous track in a playback queue), an "alarm" operation (e.g., initiating a "play now" operation at a future time), or a "join zone" operation (e.g., a playback device joins a zone that includes one or more other playback devices and joins the other playback devices in synchronous playback of the zone's playback queue). In some situations, commands received by the computing system 602 that are associated with "explicit" or "high priority" playback operations may be honored instead of commands that are associated with "implicit" or "low priority" playback operations. "Implicit" or "low priority" playback operations that are being performed by a first playback device may be overridden by "explicit" or "high priority" playback operations that are performed by a second device.

Additionally or alternatively, the request 611 may also explicitly indicate a priority level associated with the at least one playback operation, perhaps with such data tags as "EXPLICIT_USER_COMMAND," "EXPLICIT: PLAY," "EXPLICIT: SKIP_FORWARD," or "HIGH_PRIORITY." Such high priority playback operations may include alarm operations, where the associated command indicates a sequence of one or more playback operations to be performed at a later time.

In other examples, the request is associated with a playback operation that is to be completed after other playback operations of the sequence. For example, the request 619 may indicate that the playback operation 804 related to the media content (e.g., "Track b") requested by the media playback system 606 is a playback operation that is to be performed after other playback operations of the sequence 800. That is, the media playback system 606 might not immediately send the request 619 after receiving the command 615 because the playback operation 802 precedes playback operation 804 in the sequence 800.

Playback operations that are to be executed after other playback operations of a sequence may be considered "low priority" based on an inference that a user considers such playback operations to be "low priority." If the request 619 includes information explicitly indicating a low priority level associated with such a playback operation, such information may include "IMPLICIT_SYSTEM_COMMAND" or "LOW_PRIORITY." Such "low priority" or "implicit" playback operations may include a playback device, after completion of an "explicit" or "high priority" playback operation, initiating playback of a track that is next to be played in a playback queue, or selecting a next track to be played from a playlist based on a shuffle mode of the playback device being enabled.

In some examples, the computing system 602 may recognize requests that lack priority information as being an implicit or low priority command, meaning perhaps that the playback device is requesting the media content to perform the playback operation based on a state change detected by the playback device (e.g., detecting that it is time to play back a next media content of a playback queue).

The method 500 may further include, after initiating performance of a first playback operation of the sequence, determining that a second playback operation of the at least one playback operation is to be performed next according to the sequence; and sending the request for the media content based at least in part on determining that the second playback operation is to be performed next according to the sequence.

Referring back to FIG. 8, the media playback system 606 may initiate playback of "Track a" at 802. Then the media playback system 606 may determine that the playback operation 804 is to be performed next according to the sequence 800. The media playback system 606 may also determine that media content corresponding to the playback operation 804 (e.g., "Track b") may be accessible to the computing system 602 but not the media playback system 606. In this example, the request 619 may include a request for media content that includes "Track b." The request 619 may be sent, at least in part, based on determining that the playback operation 804 is to be performed next according to the sequence 800.

Referring to FIG. 7 as another example, the media playback system 604 may perform playback of "Track x" at 702, "Track y" at 704, and "Track z" at 706. Then the media playback system 604 may determine that playback operation 708 is to be performed next according to the sequence 700. The media playback system 604 may also determine that media content corresponding to the playback operation 708 (e.g., "Track x") is accessible to the computing system 602 but not the media playback system 604. In this example, the request 611 may include a request for media content that includes "Track x." The request 611 may be sent, at least in part, based on determining that the playback operation 708 is to be performed next according to the sequence 700.

As shown by both FIGS. 7 and 8, playback operations included as part of sequences 700 and 800 may include a media playback system playing back media content that is stored within the media playback system and/or playing back media content that is stored outside of the media playback system (e.g., stored within computing system 602). For example, the sequence 700 of FIG. 7 includes playing back "Track y" that is stored within media playback system 604 and "Track x" that is stored within computing system 602. Also, the sequence 800 of FIG. 8 includes playing back "Track a" that is stored within media playback system 606 and playing back "Track b" that is stored within computing system 602.

The method 500 may also include receiving the media content from the computing system; and initiating the at least one playback operation that is related to the received media content. For example, the media playback system 604 may receive, from computing system 602, the requested media content 621 (e.g., "Track x") and initiate the playback operation that is related to the received media content 621. The media playback system 606 may also receive the requested media content 622 (e.g., "Track b") from the computing system 602 and initiate the playback operation that is related to the received media content 622.

Figure 9:
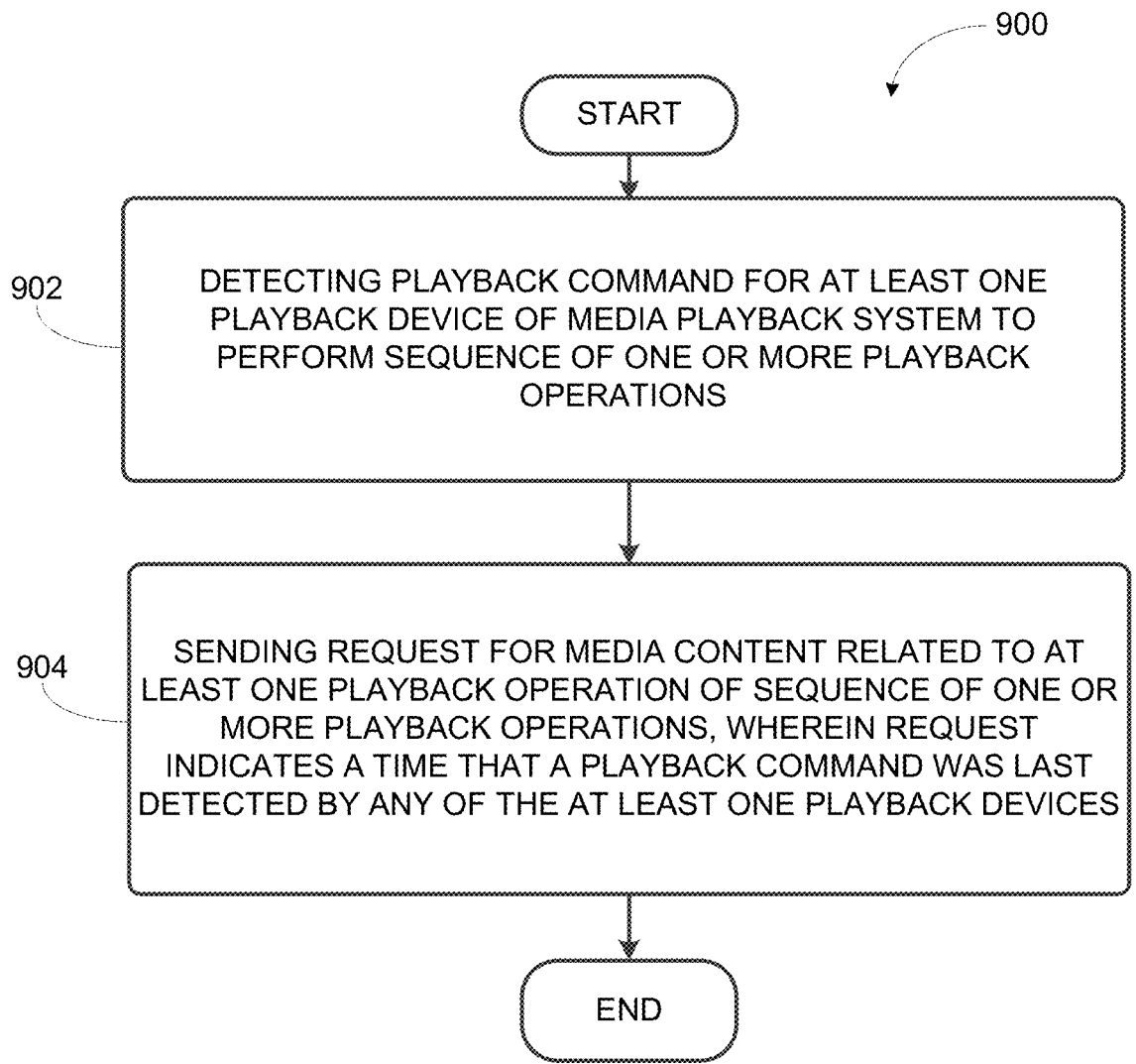
FIG. 9 shows an example flow diagram of an example method.

Referring now to FIG. 9, at block 902, the method 900 includes detecting, by a media playback system, a playback command for at least one playback device of the media playback system to perform a sequence of one or more playback operations. For example, block 902 may include any functionality described above with respect to block 502. The playback command may include any of the commands used as examples above in the description related to blocks 502 and 504.

At block 904, the method 900 includes sending, by the media playback system to a computing system, a request for media content related to at least one playback operation of the sequence of one or more playback operations, where the request indicates a time that a playback command was last detected by any of the at least one playback devices. Block 904 may be functionally similar in some respects to block 504 described above. However, instead of (or in addition to) the request including information characterizing the at least one playback operation, the request may indicate a time that a playback command was last detected by any of the at least one playback devices.

Referring to FIG. 6A as an example, the request 611 may indicate that the media playback system 604 last detected a playback command (e.g., command 609) 5 seconds ago, whereas the request 619 may indicate that the media playback system 606 last detected a playback command (e.g., command 615) 5 minutes ago. One explanation for why more time may have transpired between (i) detecting command 615 and sending request 619 as compared to time transpired between (ii) detecting command 609 and sending request 611 is that the media content requested by the media playback system 606 may be related to a playback operation that is not first of a sequence of playback operations (as indicated by command 615) whereas the media content requested by media playback system 604 is related to a playback operation that is first of a sequence (as indicated by command 609). This information may facilitate the computing system determining whether to honor request 611 or request 619 by sending corresponding media content to either the media playback system 604 or the media playback system 606.

In one example, the request 611 may include a time stamp (e.g., "21:43:57 11-Mar-14"). In this case, the media playback system 604 and the computing system 602 may have access to respective clocks that are synchronized to one another such that both the media playback system 604 and the computing system 602 recognize timestamps with respect to the same frame of reference. In another example, the request 611 may simply include a duration that has passed since the media playback system 604 last received a playback command. Here, it might not be necessary for the computing system 602 and the media playback system 604 to maintain mutually synchronized clocks. Playback operations that are associated with more recently received playback commands may be determined to have higher priority than playback operations that are associated with less recently received playback commands, as it may be possible that the more recently received playback command was intended to supersede the less recently received playback command, should the two commands conflict with respect to an amount of media streams that playback devices associated with the account may be allowed to receive.

Figure 10:
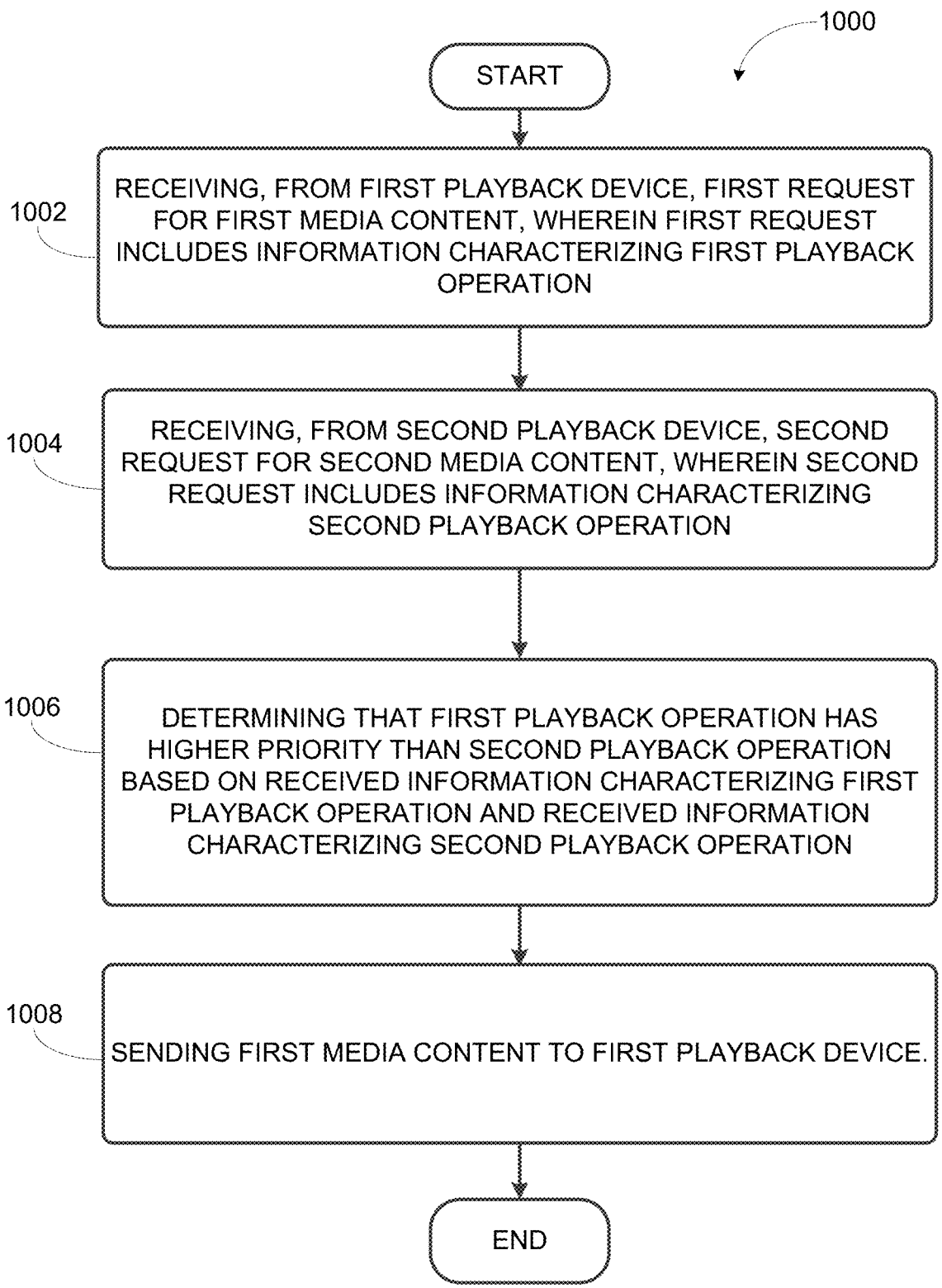
FIG. 10 shows an example flow diagram of an example method.

Referring now to FIG. 10, at block 1002, the method 1000 includes receiving, by a computing system from a first playback device, a first request for first media content, where the first request includes information characterizing a first playback operation and the first playback device is associated with an account of the media service provider, and where the computing system is associated with a media service provider.

Referring to back FIG. 6A, the computing system 602 may receive the first request 611 from the first playback device 608. In some examples, the computing system 602 may be another playback device that serves as a gateway communicatively coupling (i) a computing system associated with the media service provider and (ii) playback devices 608, 612, 614, or 618. In other examples, the computing system 602 may include a server or network of servers associated with the media service provider.

The first request 611 may include a request for first media content 621 and information characterizing a first playback operation that is related to the first media content 621. For example, the first request 611 may indicate that the first media content 621 (e.g., "Track x") is related to playback operation 702 of FIG. 7, which includes playing back "Track x" as a first playback operation of the sequence 700. In some examples, the computing system 602 may send an indication to the playback device 608 indicating that the computing system 602 is configured to determine whether to honor media content requests based on information characterizing playback operation. As shown in FIG. 6B, the first request 1311 may indicate that the first playback operation is to be carried out on a user's "primary" playback device, such as a smartphone. Such an indication may be indicative of a "high priority" playback operation.

At block 1004, the method 1000 includes receiving, by the computing system from a second playback device, a second request for second media content, where the second request includes information characterizing a second playback operation and the second playback device is associated with the account of the media service provider. As an example, the computing system 602 may receive the second request 619 from the second playback device 614. The second request 619 may include a request for the second media content 622 and information characterizing a second playback operation that is related to the second media content 622. For example, the second request 619 may indicate that the second media content 622 (e.g., "Track b") is related to playback operation 804 of FIG. 8, which includes playing back "Track b" as a second playback operation of the sequence 800. In some examples, the first media content 621 and the second media content 622 may be instances of the same media content.

At block 1006, the method 1000 includes determining, by the computing system, that the first playback operation has a higher priority than the second playback operation based on the received information characterizing the first playback operation and the received information characterizing the second playback operation. For example, the computing system 602 may determine that the first playback operation 702 has a higher priority than the second playback operation 804 based on (i) the received information that indicates that the first playback operation 702 is to be performed as a first playback operation of the sequence 700 and (ii) the received information that indicates that the second playback operation 804 is to be performed second (e.g. not first) of the sequence 800. In other examples, the second playback operation may be associated with other positions within the sequence 800 that are not first in the sequence 800. In another example depicted in FIGS. 6A and 6B, the computing system 602 may determine that the first playback operation has higher priority than the second playback operation because the request 1311 indicated that the first playback operation is to be carried out by the user's "primary" device, such as the media playback system 1304 (e.g., a smartphone).

Block 1006 may be performed in situations where a number of concurrent requests for media content to be provided by the computing system 602 exceeds an amount of media streams that a group of playback devices associated with an account of a media service provider is allowed to receive.

At block 1008, the method 1000 includes, after determining that the first playback operation has a higher priority, sending, by the computing system, the first media content to the first playback device. For example, the computing system 602 may send the first media content 621 to the first playback device 608 after determining that the first playback operation 702 has a higher priority than playback operation 804. In some situations, the computing system 602 may stop sending the second media content 622 to the playback device 614 or might not send the second media content 622 to the playback device 614 at all.

In some situations, prior to sending the first media content 621 to the first playback device 608, the computing system 602 may send the second media content 622 to the second playback device 614. For example, the computing system 602 may have already received the second request 619 and the second playback device 614 may already be performing the second playback operation 804 when the computing system 602 receives the first request 611 from the first playback device 608.

Next, the computing system 602 may determine that continuing to send the second media content 622 to the second playback device 614 would cause a group of one or more playback devices associated with the account to concurrently receive more media streams than the group is allowed to receive. Since the computing system 602 may be already sending the second media content 622 to the second playback device 614, the computing system 602 may then determine whether to continue sending the second media content 622 to the second playback device 614 or to send the first media content 621 to the first playback device 608. In this case, because the first playback operation 702 has a higher priority than the second playback operation 804, the computing system 602 determines to send the first media content 621 to the first playback device 608. Based on the determining that continuing to send the second media content 622 to the second playback device 614 would cause the group of one or more playback devices (e.g., playback devices 608 and 614) associated with the account to concurrently receive more media streams than the group is allowed to receive, the computing system 602 may also stop sending the second media content 622 to the second media playback device 614.

In another example, the group of playback devices associated with the account may be allowed to collectively receive two (or more) media streams at one time. The computing system 602 may be providing the first media content 621 to the first playback device 608 when the computing system 602 receives the second request 619. The computing system 602 may then determine that sending the second media content 622 to the second playback device 614 would not cause a group of one or more playback devices associated with the account to concurrently receive more media streams than the group is allowed to receive. In response, the computing system 602 may send the second media content 622 to the second playback device 614.

Figure 11:
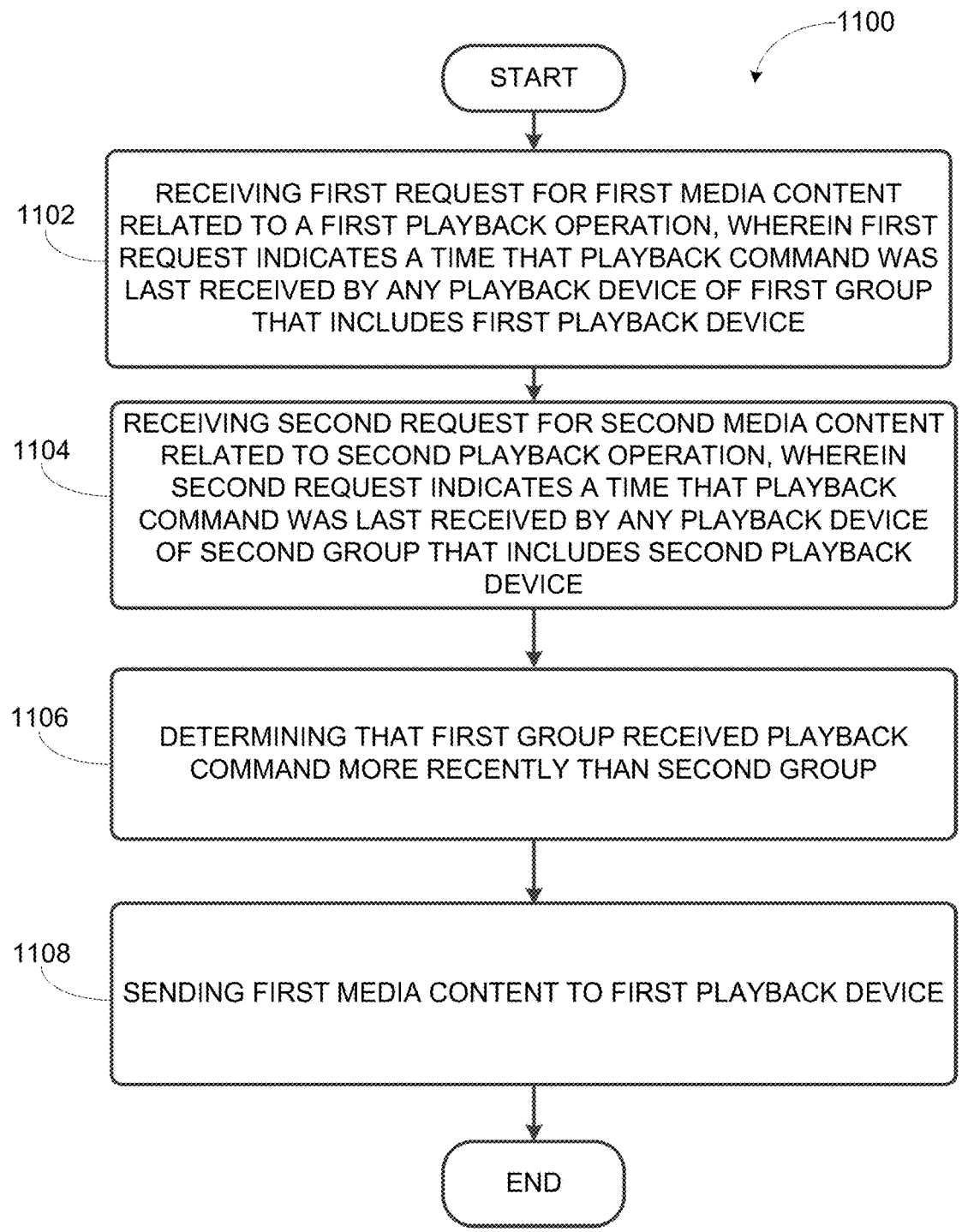
FIG. 11 shows an example flow diagram of an example method.

Referring now to FIG. 11, at block 1102, the method 1100 includes receiving, by a computing system associated with a media service provider from a first playback device associated with an account of the media service provider, a first request for first media content related to a first playback operation, where the first request indicates a time that a playback command was last received by any playback device of a first group of one or more playback devices that includes the first playback device. The first group of playback devices may be an arbitrary group of playback devices, playback devices making up a playback zone, or playback devices making up a media playback system. As discussed above in relation to block 904, the first request may indicate a duration that has passed since any playback device of the first group last detected a playback command, or the first request may include timestamp data indicating a time at which any playback device of the first group last detected a playback command.

At block 1104, the method 1100 includes receiving, by the computing system from a second playback device associated with the account, a second request for second media content related to a second playback operation, where the second request indicates a time that a playback command was last received by any playback device of a second group of one or more playback devices that includes the second playback device. The second group of playback devices may be an arbitrary group of playback devices, playback devices making up a playback zone, or playback devices making up a media playback system. As discussed above in relation to block 904, the second request may indicate a duration that has passed since any playback device of the second playback system last detected a playback command, or the second request may include timestamp data indicating a time at which any playback device of the second playback system last detected a playback command.

At block 1106, the method 1100 includes determining that the first group received a playback command more recently than the second group. For example, the computing system 602 may compare timestamps and/or duration data included in the first request 611 and the second request 619 to determine that the first playback system received a playback command more recently than the second playback system.

At block 1108, the method 1100 includes sending the first media content to the first playback device. Block 1108 may include any functionality described above in relation to block 1008.

Figure 12:
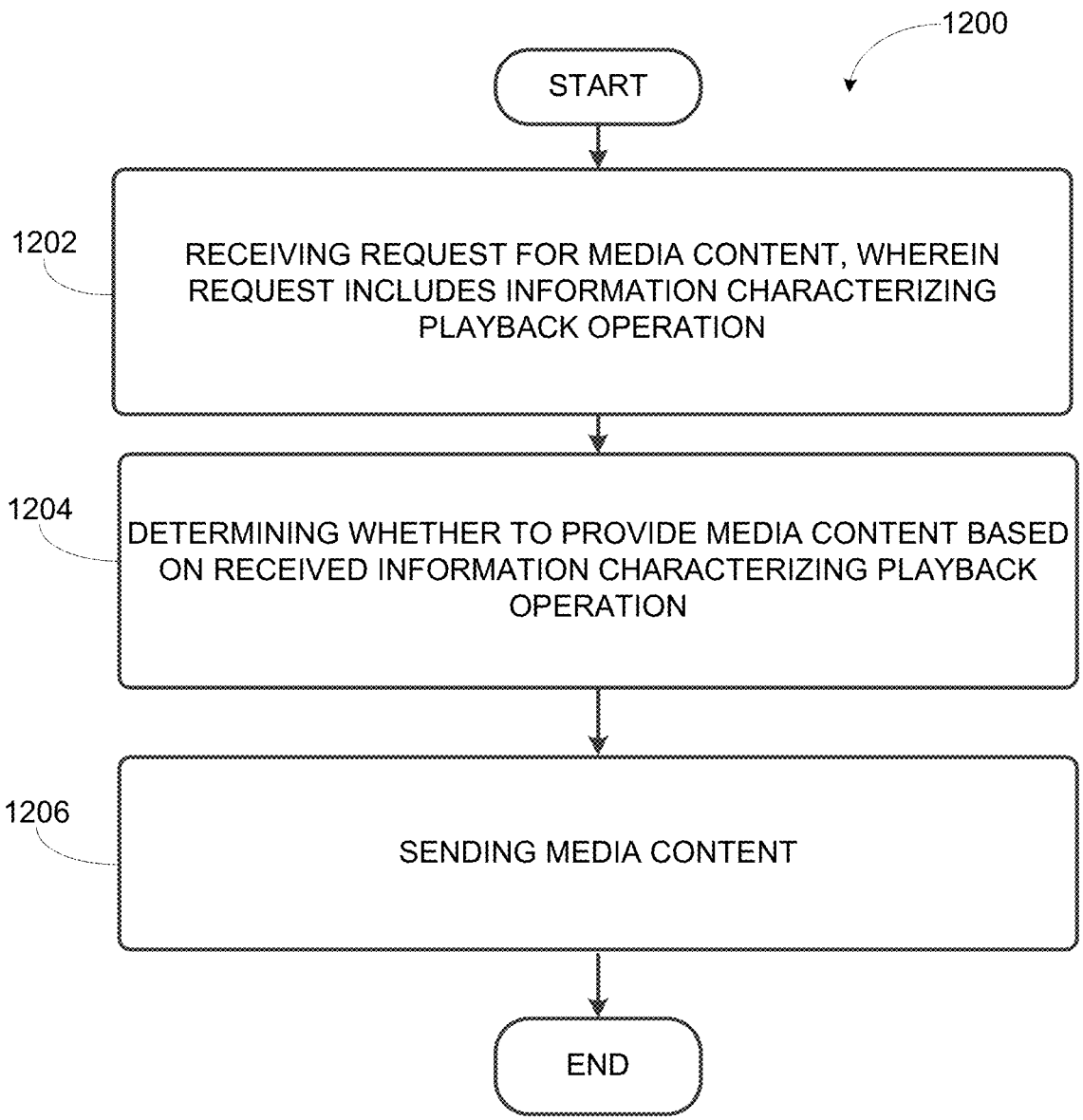
FIG. 12 shows an example flow diagram of an example method.

Referring now to FIG. 12, at block 1202, the method 1200 includes receiving, by a computing system from a playback device, a request for media content, where the request includes information characterizing a playback operation and the playback device is associated with an account of the media service provider. Referring to FIG. 6A as an example, the computing system 602 may receive the request 611 from the playback device 608. The playback device 608 may request the media content 621 so that the playback device 608 may perform playback operation 702 of FIG. 7, for example. The request 611 may include information characterizing the playback operation 702, indicating that the playback operation 702 may be first to be performed of a sequence 700 of playback operations 702-712. (In other examples, the sequence may only include a single playback operation that is considered first of the sequence by default.)

At block 1204, the method 1200 includes determining, by the computing system, whether to provide the media content based on the received information characterizing the playback operation. Since the received information indicates that the playback operation 702 is first to be performed of the sequence 700, the computing system may determine to provide the media content 621 to the playback device 608. In another example, the computing system 602 may determine not to provide media content to a playback device if the received request indicates that a playback operation related to the requested media content is not a first playback operation of a sequence.

At block 1206, the method 1200 includes sending, by the computing system, the media content 621 to the playback device. For example, the computing system 602 sends the media content 621 to the playback device 608.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In one aspect, a method is provided. The method involves detecting, by a media playback system, a command for at least one playback device of the media playback system to perform a sequence of one or more playback operations; and sending, by the media playback system to a computing system, a request for media content related to at least one playback operation of the sequence of one or more playback operations, where the request includes information characterizing the at least one playback operation.

In another aspect, a non-transitory computer-readable medium is provided. The non-transitory computer-readable medium has stored thereon instructions executable by a media playback system to cause the media playback system to perform functions. The functions include detecting a command for at least one playback device of the media playback system to perform a sequence of one or more playback operations; and sending, to a computing system, a request for media content related to at least one playback operation of the sequence of one or more playback operations, where the request includes information characterizing the at least one playback operation.

In yet another aspect, a media playback system is provided. The media playback system includes a processor and a non-transitory computer-readable medium storing instructions that when executed by the media playback system cause the media playback system to perform functions comprising: detecting a command for at least one playback device of the media playback system to perform a sequence of one or more playback operations; and sending, to a computing system, a request for media content related to at least one playback operation of the sequence of one or more playback operations, where the request includes information characterizing the at least one playback operation.

In another aspect, a method is provided. The method involves detecting, by a media playback system, a playback command for at least one playback device of the media playback system to perform a sequence of one or more playback operations; and sending, by the media playback system to a computing system, a request for media content related to at least one playback operation of the sequence of one or more playback operations, where the request indicates a time that a playback command was last detected by any of the at least one playback devices.

In yet another aspect, a non-transitory computer-readable medium is provided. The non-transitory computer-readable medium has stored thereon instructions executable by a media playback system to cause the media playback system to perform functions. The functions include detecting a playback command for at least one playback device of the media playback system to perform a sequence of one or more playback operations; and sending, to a computing system, a request for media content related to at least one playback operation of the sequence of one or more playback operations, where the request indicates a time that a playback command was last detected by any of the at least one playback devices.

In another aspect, a media playback system is provided. The media playback system includes a processor and a computer-readable medium storing instructions that when executed by the media playback system cause the media playback system to perform functions comprising: detecting a playback command for at least one playback device of the media playback system to perform a sequence of one or more playback operations; and sending, to a computing system, a request for media content related to at least one playback operation of the sequence of one or more playback operations, where the request indicates a time that a playback command was last detected by any of the at least one playback devices.

In another aspect, the disclosure includes a method that comprises receiving, by a computing system from a first playback device, a first request for first media content, where the first request includes information characterizing a first playback operation and the first playback device is associated with an account of the media service provider, and where the computing system is associated with a media service provider; receiving, by the computing system from a second playback device, a second request for second media content, where the second request includes information characterizing a second playback operation and the second playback device is associated with the account of the media service provider; determining, by the computing system, that the first playback operation has a higher priority than the second playback operation based on the received information characterizing the first playback operation and the received information characterizing the second playback operation; and after determining that the first playback operation has a higher priority, sending, by the computing system, the first media content to the first playback device.

In yet another aspect, a non-transitory computer-readable medium is provided. The non-transitory computer-readable medium has stored thereon instructions executable by a computing system to cause the computing system to perform functions. The computing system is associated with a media service provider. The functions include receiving, from a first playback device, a first request for first media content, where the first request includes information characterizing a first playback operation and the first playback device is associated with an account of the media service provider; receiving, from a second playback device, a second request for second media content, where the second request includes information characterizing a second playback operation and the second playback device is associated with the account of the media service provider; determining that the first playback operation has a higher priority than the second playback operation based on the received information characterizing the first playback operation and the received information characterizing the second playback operation; and after determining that the first playback operation has a higher priority, sending the first media content to the first playback device.

In yet another aspect, a computing system associated with a media service provider is provided. The computing system includes a processor and a computer-readable medium storing instructions that when executed by the computing system cause the computing device to perform functions comprising: receiving, from a first playback device, a first request for first media content, where the first request includes information characterizing a first playback operation and the first playback device is associated with an account of the media service provider; receiving, from a second playback device, a second request for second media content, where the second request includes information characterizing a second playback operation and the second playback device is associated with the account of the media service provider; determining that the first playback operation has a higher priority than the second playback operation based on the received information characterizing the first playback operation and the received information characterizing the second playback operation; and after determining that the first playback operation has a higher priority, sending the first media content to the first playback device.

In another aspect, the disclosure includes a method that comprises receiving, by a computing system associated with a media service provider from a first playback device associated with an account of the media service provider, a first request for first media content related to a first playback operation, where the first request indicates a time that a playback command was last received by any playback device of a first group of one or more playback devices that includes the first playback device; receiving, by the computing system from a second playback device associated with the account, a second request for second media content related to a second playback operation, where the second request indicates a time that a playback command was last received by any playback device of a second group of one or more playback devices that includes the second playback device; determining that the first group received a playback command more recently than the second group; and sending the first media content to the first playback device.

In yet another aspect, a non-transitory computer-readable medium is provided. The non-transitory computer-readable medium has stored thereon instructions executable by a computing system to cause the computing system to perform functions. The computing system is associated with a media service provider. The functions include receiving, from a first playback device associated with an account of the media service provider, a first request for first media content related to a first playback operation, where the first request indicates a time that a playback command was last received by any playback device of a first group of one or more playback devices that includes the first playback device; receiving, from a second playback device associated with the account, a second request for second media content related to a second playback operation, where the second request indicates a time that a playback command was last received by any playback device of a second group of one or more playback devices that includes the second playback device; determining that the first group received a playback command more recently than the second group; and sending the first media content to the first playback device.

In yet another aspect, a computing system associated with a media service provider is provided. The computing system includes a processor and a computer-readable medium storing instructions that when executed by the computing system cause the computing device to perform functions comprising: receiving, from a first playback device associated with an account of the media service provider, a first request for first media content related to a first playback operation, where the first request indicates a time that a playback command was last received by any playback device of a first group of one or more playback devices that includes the first playback device; receiving, from a second playback device associated with the account, a second request for second media content related to a second playback operation, where the second request indicates a time that a playback command was last received by any playback device of a second group of one or more playback devices that includes the second playback device; determining that the first group received a playback command more recently than the second group; and sending the first media content to the first playback device.

In yet another aspect, a method is provided that includes receiving, by a computing system from a playback device, a request for media content, where the request includes information characterizing a playback operation and the playback device is associated with an account of the media service provider; determining whether to provide the media content based on the received information characterizing the playback operation; and sending the media content to the playback device.

In yet another aspect, a non-transitory computer-readable medium is provided. The non-transitory computer-readable medium has stored thereon instructions executable by a computing system to cause the computing system to perform functions. The computing system is associated with a media service provider. The functions include receiving, from a playback device, a request for media content, where the request includes information characterizing a playback operation and the playback device is associated with an account of the media service provider; determining whether to provide the media content based on the received information characterizing the playback operation; and sending the media content to the playback device.

In yet another aspect, a computing system associated with a media service provider is provided. The computing system includes a processor and a computer-readable medium storing instructions that when executed by the computing system cause the computing device to perform functions comprising: receiving, from a playback device, a request for media content, where the request includes information characterizing a playback operation and the playback device is associated with an account of the media service provider; determining whether to provide the media content based on the received information characterizing the playback operation; and sending the media content to the playback device.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:
at least one processor;
at least one non-transitory computer-readable medium comprising program instructions that are executable by the at least one processor such that the computing system is configured to:
receive, from a first playback device authenticated with the computing system via a first account, a first request for first media content, wherein the first request is associated with a first playback command received by the first playback device at a first time;
receive, from a second playback device authenticated with the computing system via the first account, a second request for second media content, wherein the second request is associated with a second playback command received by the second playback device at a second time;
determine that the second time is later than the first time; and
based at least on the determination that the second time is later than the first time, send the second media content to the second playback device.

2. The computing system of claim 1, wherein the at least one non-transitory computer-readable medium further comprises program instructions such that the computing system is configured to:
based at least on the determination that the second time is later than the first time, forego sending the first media content to the first playback device.

3. The computing system of claim 1, wherein the at least one non-transitory computer-readable medium further comprises program instructions such that the computing system is configured to:
after receiving the first request from the first playback device, send the first media content to the first playback device; and
while sending the first media content to the first playback device, receive the second request from the second playback device.

4. The computing system of claim 3, wherein sending the second media content to the second playback device comprises discontinuing sending of the first media content to the first playback device.

5. The computing system of claim 3, wherein sending the second media content to the second playback device comprises sending the second media content to the second playback device concurrently with the first media content sent to the first playback device.

6. The computing system of claim 1, wherein:
the first request includes first data indicating the first time at which the first playback command was received; and
the second request includes second data indicating the second time at which the second playback command was received.

7. The computing system of claim 6, wherein the first data and the second data include at least one of:
respective timestamp data indicating the time at which the respective playback devices detected the respective playback commands; or
respective duration data indicating a duration that has passed since the respective playback devices received the respective playback commands.

8. The computing system of claim 1, wherein the determination that the second time is later than the first time comprises comparing first data associated with the first request with second data associated with the second request.

9. A non-transitory computer-readable medium having stored thereon instructions executable by one or more processors to cause a computing system to perform functions comprising:

receiving, from a first playback device authenticated with the computing system via a first account, a first request for first media content, wherein the first request is associated with a first playback command received by the first playback device at a first time;

receiving, from a second playback device authenticated with the computing system via the first account, a second request for second media content, wherein the second request is associated with a second playback command received by the second playback device at a second time;

determining that the second time is later than the first time; and based at least on the determination that the second time is later than the first time, sending the second media content to the second playback device.

10. The non-transitory computer-readable medium of claim 9, further having stored thereon instructions to cause the computing system to perform functions comprising:

based at least on the determination that the second time is later than the first time, foregoing sending the first media content to the first playback device.

11. The non-transitory computer-readable medium of claim 9, further having stored thereon instructions to cause the computing system to perform functions comprising:

after receiving the first request from the first playback device, sending the first media content to the first playback device; and while sending the first media content to the first playback device, receiving the second request from the second playback device.

12. The non-transitory computer-readable medium of claim 11, wherein sending the second media content to the second playback device comprises discontinuing sending of the first media content to the first playback device.

13. The non-transitory computer-readable medium of claim 11, wherein sending the second media content to the second playback device comprises sending the second media content to the second playback device concurrently with the first media content sent to the first playback device.

14. The non-transitory computer-readable medium of claim 9, wherein:

the first request includes first data indicating the first time at which the first playback command was received; and the second request includes second data indicating the second time at which the second playback command was received.

15. The non-transitory computer-readable medium of claim 14, wherein the first data and the second data include at least one of:

respective timestamp data indicating the time at which the respective playback devices detected the respective playback commands; or respective duration data indicating a duration that has passed since the respective playback devices received the respective playback commands.

16. The non-transitory computer-readable medium of claim 14, wherein the determination that the second time is later than the first time comprises comparing first data associated with the first request with second data associated with the second request.

17. A method to be performed by a computing system, the method comprising:

receiving, from a first playback device authenticated with the computing system via a first account, a first request for first media content, wherein the first request is associated with a first playback command received by the first playback device at a first time;

receiving, from a second playback device authenticated with the computing system via the first account, a second request for second media content, wherein the second request is associated with a second playback command received by the second playback device at a second time;

determining that the second time is later than the first time; and based at least on the determination that the second time is later than the first time, sending the second media content to the second playback device.

18. The method of claim 17, further comprising:

based at least on the determination that the second time is later than the first time, foregoing sending the first media content to the first playback device.

19. The method of claim 17, further comprising:

after receiving the first request from the first playback device, sending the first media content to the first playback device; and while sending the first media content to the first playback device, receiving the second request from the second playback device.

20. The method of claim 19, wherein sending the second media content to the second playback device comprises discontinuing sending of the first media content to the first playback device.

* * * * *